United States Patent
Ohtaki

(10) Patent No.: US 6,959,175 B2
(45) Date of Patent: Oct. 25, 2005

(54) RECEIVER CAPABLE OF RECEIVING RADIO SIGNALS IN A PREFERRED STATE AT ALL TIMES

(75) Inventor: Yukio Ohtaki, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 456 days.

(21) Appl. No.: 10/314,610

(22) Filed: Dec. 9, 2002

(65) Prior Publication Data

US 2003/0109242 A1 Jun. 12, 2003

(30) Foreign Application Priority Data

Dec. 10, 2001 (JP) ........................................ 2001-376088
Dec. 10, 2001 (JP) ........................................ 2001-376091

(51) Int. Cl.[7] ................................................. H04B 1/16
(52) U.S. Cl. ........................ 455/139; 455/141; 455/260; 455/265
(58) Field of Search ................................. 455/335, 141, 455/137, 139, 138, 136, 132, 265, 258, 260; 375/327, 347

(56) References Cited

U.S. PATENT DOCUMENTS

| | | | |
|---|---|---|---|
| 4,079,318 A | * | 3/1978 | Kinoshita .................... 455/139 |
| 4,406,017 A | * | 9/1983 | Takahashi .................... 455/137 |
| 5,175,729 A | * | 12/1992 | Borras et al. ................ 370/345 |
| 5,748,683 A | * | 5/1998 | Smith et al. ................. 375/347 |
| 6,148,186 A | * | 11/2000 | Fujita .......................... 455/137 |
| 6,157,260 A | * | 12/2000 | Tilley et al. .................... 331/2 |
| 6,229,399 B1 | * | 5/2001 | Tobise et al. ................ 327/147 |
| 2002/0173284 A1 | * | 11/2002 | Forrester ..................... 455/255 |

FOREIGN PATENT DOCUMENTS

JP 2000-236206 8/2000

* cited by examiner

*Primary Examiner*—Edward F. Urban
*Assistant Examiner*—Adeel Haroon
(74) *Attorney, Agent, or Firm*—Brinks Hofer Gilson & Lione

(57) ABSTRACT

A receiver has an adder for output intermediate-frequency signals of a plurality of receiving blocks, a demodulator for an added intermediate-frequency signal, adjustable reference-signal generator for supplying phase-shifted reference signals to the PLL circuits of the plurality of receiving blocks, and a plurality of switches. The switches are controlled when power is first supplied to the receiver such that the frequency-divided reference signals to the PLL circuits are in phase with one another. The adjustable reference-signal generator, upon tuning on power, is set in the phase-shift adjusted state stored immediately before previously turning off the power.

15 Claims, 10 Drawing Sheets

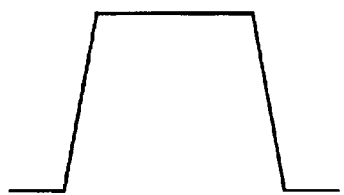
FIG. 9A
TRANSMISSION WAVEFORM
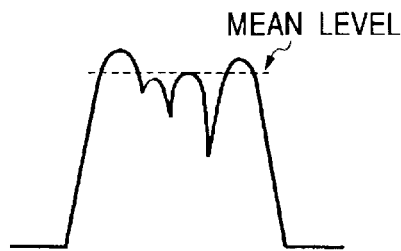
FIG. 9B
RECEPTION WAVEFORM
(WITH GREAT SIGNAL DISPERSION)
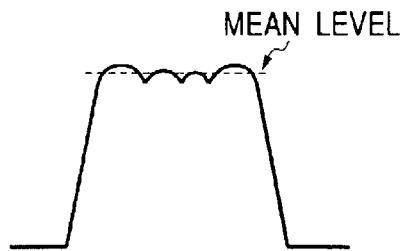
FIG. 9C
RECEPTION WAVEFORM
(WITH SMALL SIGNAL DISPERSION)
FIG. 10
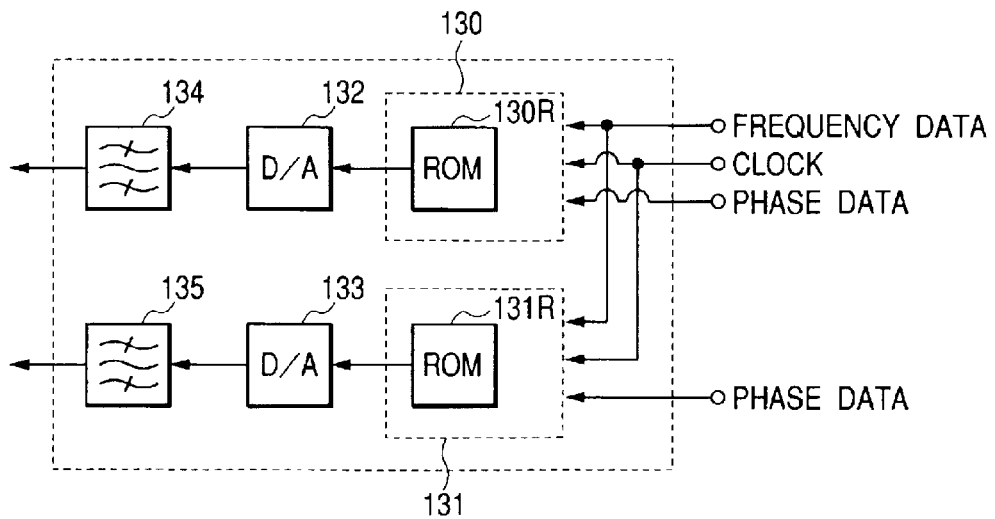

RECEIVER CAPABLE OF RECEIVING RADIO SIGNALS IN A PREFERRED STATE AT ALL TIMES

This application is based on application No. 2001-376088 and 2001-376091 both filed on Dec. 10, 2001 in Japan, the contents of which are hereby incorporated by reference.

BACKGROUND OF THE INVENTION

1. Technical Field of the Invention

The present invention relates to receivers and, more particularly, to a receiver capable of receiving a radio signal whose electric-field intensity constantly varies. The receiver remains in a preferred state by receiving the same radio signal by means of a plurality of receiving blocks and synthesizing, in phase, the output signals of the receiving blocks.

Additionally, the invention relates to OFDM signal receivers and, more particularly, to an OFDM signal receiver that receives OFDM signals to be used in terrestrial-wave digital broadcast and which has a suitable diversity receiving function for use in a vehicular receiver.

2. Description of the Related Art

In receivers that receive radio signals in which the intensity of the signal varies at all times, such as in a vehicular receiver, it is general practice to use a receiver having a plurality of receiving blocks. One type of such a receiver is a diversity receiver. The receiver of this kind is arranged with a plurality of receiving blocks that are connected and arranged in a parallel form. Each of the receiving blocks has an antenna, a high-frequency amplifier to amplify a received high-frequency signal, a frequency mixer to frequency-mix together a high-frequency signal and a local oscillation signal, and an intermediate-frequency circuit to extract an intermediate-frequency signal out of an output frequency-mixed signal of the frequency mixer. An adder adds together the intermediate-frequency signals outputted from the receiving blocks, a demodulator demodulates the added intermediate-frequency signal, a common local oscillator supplies a local oscillation signal to the frequency mixers, and a plurality of phase shifters connected and arranged between the frequency mixers and the common local oscillator individually phase-shift the local oscillation signals to be supplied to the frequency mixers.

FIG. 5 is a block diagram showing an example of an essential-part configuration of a known receiver having a plurality of receiving blocks, showing an example the plurality of receiving blocks are three blocks.

As shown in FIG. 5, the receiver has a first receiving block 50, a second receiving block 51, a third receiving block 52, an adder (ADD) 53, a demodulator (DET) 54, a demodulated-signal output terminal 55, a local oscillator 56 and three phase shifters 57, 58, 59. In this case, the first receiving block 50 has an antenna 60, a high-frequency amplifier 61, a frequency mixer 62 and an intermediate-frequency filter (FIL) 63. The second receiving block 51 has an antenna 64, a high-frequency amplifier 65, a frequency mixer 66 and an intermediate-frequency filter (FIL) 67. The third receiving block 52 has an antenna 68, a high-frequency amplifier 69, a frequency mixer 70 and an intermediate-frequency filter (FIL) 71. Incidentally, the three antennas 60, 64, 68 are arranged in positions comparatively distant from one another.

In the first receiving block 50, the high-frequency amplifier 61 has an input end connected to the antenna 60 and an output end connected to a first input end of the frequency mixer 62. The frequency mixer 62 has a second input end connected to an output end of the phase shifter 57 and an output end connected to an input end of the intermediate-frequency filter 63. The intermediate-frequency filter 63 has an output end connected to a first input end of the adder 53. In the second receiving block 51, the high-frequency amplifier 65 has an input end connected to the antenna 64 and an output end connected to a first input end of the frequency mixer 66. The frequency mixer 66 has a second input end connected to an output end of the phase shifter 58 and an output end connected to an input end of the intermediate-frequency filter 67. The intermediate-frequency filter 67 has an output end connected to a second input end of the adder 53. In the third receiving block 52, the high-frequency amplifier 69 has an input end connected to the antenna 68 and an output end connected to a first input end of the frequency mixer 70. The frequency mixer 70 has a second input end connected to an output end of the phase shifter 59 and an output end connected to an input end of the intermediate-frequency filter 71. The intermediate-frequency filter 71 has an output end connected to a third input end of the adder 53.

Meanwhile, the adder 53 has an output end connected to an input end of the demodulator 54 while the demodulator 54 has an output end connected to the demodulated-signal output terminal 55. The phase shifters 57, 58, 59 have respective input ends connected to an output end of the local oscillator 56. Furthermore, the phase shifters 57, 58, 59 have respective control input ends coupled to a control output end of the demodulator 54.

The receiver having a plurality of receiving blocks thus configured operates generally as follows.

When the same radio signal is received at the three antennas 60, 64, 68, the reception signals are respectively amplified by the high-frequency amplifiers 61, 65, 69 and supplied to the frequency mixers 62, 66, 70. The frequency mixers 62, 66, 70 frequency-mix together the reception signal and the local oscillation signal supplied from the local oscillator 56 through the phase shifter 57, 58, 59, respectively generates frequency-mixed signals. The intermediate-frequency filter 63, 67, 71 selects an intermediate-frequency signal out of the frequency-mixed signal outputted by the frequency mixer 62, 66, 70, and supplies a selected intermediate-frequency signal to the adder 53. The adder 53 adds/combines, in phase, the three supplied intermediate-frequency signals to form an added intermediate-frequency signal as mentioned later, and supplies the added intermediate-frequency signal to the demodulator 54. The demodulator 54 demodulates the added intermediate-frequency signal and supplies a demodulated signal to a utilization circuit (not shown) through the demodulated-signal output terminal 55.

At this time, the demodulator 54 individually adjusts the phase-shift amounts of the phase shifters 57, 58, 59, to thereby change the phase of the local oscillation signal outputted from the phase shifter 57, 58, 59, thus carrying out adjustment such that the added intermediate-frequency signal supplied is maximized in signal power, i.e. such that the intermediate-frequency signals to be added/combined in the adder 53 are in phase with one another. By carrying out such adjustment, the added intermediate-frequency signal is maximized in signal power, to enable radio signal reception in a preferred state.

In general, the OFDM (Orthogonal Frequency Division Multiplex) signal receiver to be mounted on a moving body, such as an automobile, causes fading so that the intensity of a reception radio wave fluctuates due to movement of the moving body. As a result, reception of a reception signal in a preferred state at all times is impossible. Consequently, in order to avoid not receiving reception signals in a preferred state (as caused by fading above) at all times, the signal receiver of this kind adopts a diversity receiving function or the like having a plurality of receiving blocks to enable reception in a preferred state.

FIG. 11 is a block diagram showing an example of a configuration of a known OFDM signal receiver having a plurality of receiving blocks, showing an example having two receiving blocks as the plurality of receiving blocks.

As shown in FIG. 11, this OFDM signal receiver has a first receiving block 141, a second receiving block 142, a first local oscillator 143, a PLL circuit 144, a reference-signal oscillator 145, a second local oscillator 146, diversity signal adding means 147, an OFDM demodulator 148 and a demodulated-signal output terminal 149. In this case, the first receiving block 141 has an antenna 150, a high-frequency filter 151, a low-noise high-frequency amplifier 152, a first frequency mixer 153, a first intermediate-frequency filter 154, a second frequency mixer 155, a second intermediate-frequency filter 156 and an analog-digital converter (A/D) 157. The second receiving block 142 has an antenna 158, a high-frequency filter 159, a low-noise high-frequency amplifier 160, a first frequency mixer 161, a first intermediate-frequency filter 162, a second frequency mixer 163, a second intermediate-frequency filter 164 and an analog-digital converter (A/D) 165. Meanwhile, the diversity signal adding means 147 has two digital phase shifters 166, 167, a mutual correlation detector 168 and an adder 169. Incidentally, the two antennas 150, 158 are arranged in positions comparatively distant from each other.

In the first receiving block 141, the high-frequency filter 151 has an input end connected to the antenna 150 and an output end connected to an input end of the low-noise high-frequency amplifier 152. The low-noise high-frequency amplifier 152 has an output end connected to a first input end of the first frequency mixer 153. The first frequency mixer 153 has a second input end connected to an output end of the first local oscillator 143 and an output end connected to an input end of the first intermediate-frequency filter 154. The first intermediate-frequency filter 154 has an output end connected to a first input end of the second frequency mixer 155. The second frequency mixer 155 has a second input end connected to an output end of the second local oscillator 146 and an output end connected to an input end of the second intermediate-frequency filter 156. The second intermediate-frequency filter 156 has an output end connected to an input end of the analog-digital converter 157. The analog-digital converter 157 has an output end connected to a first input end connected to the diversity signal adding means 147.

Meanwhile, in the second receiving block 142, the high-frequency filter 159 has an input end connected to the antenna 158 and an output end connected to an input end of the low-noise high-frequency amplifier 160. The low-noise high-frequency amplifier 160 has an output end connected to a first input end of the first frequency mixer 161. The first frequency mixer 161 has a second input end connected to an output end of the first local oscillator 143 and an output end connected to an input end of the first intermediate-frequency filter 162. The first intermediate-frequency filter 162 has an output end connected to a first input end of the second frequency mixer 163. The second frequency mixer 163 has a second input end connected to an output end of the second local oscillator 146 and an output end connected to an input end of the second intermediate-frequency filter 164. The second intermediate-frequency filter 164 has an output end connected to an input end of the analog-digital converter 165. The analog-digital converter 165 has an output end connected to a second input end connected to the diversity signal adding means 147.

Furthermore, the first local oscillator 143 has a control end connected to an output end of the PLL circuit 144 and an output end connected to a first input end of the PLL circuit 144. The PLL circuit 144 has a second input end connected to an output end of the reference-signal oscillator 145. The OFDM demodulator 148 has an input end connected to an output end of the diversity signal adding means 147 and an output end connected to the demodulated-signal output terminal 149.

Meanwhile, in the diversity signal adding means 147, the digital phase shifter 166 has an input end connected to a first input end of the diversity signal adding means 147 and an output end connected to a first input end of the adder 169. The digital phase shifter 167 has an input end connected to a second input end of the diversity signal adding means 147 and an output end connected to a second input end of the adder 169. The mutual correlation detector 168 has a first input end connected to a first input end of the diversity signal adding means 147 and a second input end connected to a second input end of the diversity signal adding means 147, respectively. A first control end is coupled to a control end of the digital phase shifter 166 and a second control end to a control end of the digital phase shifter 167, respectively. The adder 169 has an output end connected to an output end of the diversity signal adding means 147.

The OFDM signal receiver having the above configuration operates generally as follows.

In the first receiving block 141, in case an OFDM radio signal is received at the antenna 150, the reception signal, after removed of unwanted frequency signal components by the high-frequency filter 151, is amplified by the low-noise high-frequency amplifier 152 and supplied to the first frequency mixer 153. The first frequency mixer 153 frequency-mixes together this reception signal and the first local oscillation signal supplied from the first local oscillator 143 to generate a first frequency-mixed signal. The first intermediate-frequency filter 154 selects/outputs a first intermediate-frequency signal out of the first frequency-mixed signal outputted by the first frequency mixer 153. The second frequency mixer 155 frequency-mixes together the first intermediate-frequency signal supplied from the first intermediate-frequency filter 154 and the second local oscillation signal supplied from the second local oscillator 143 to generate a second frequency-mixed signal. The second intermediate-frequency filter 156 selects/outputs a second intermediate-frequency signal out of the second frequency-mixed signal outputted by the second frequency mixer 155. The analog-digital converter 157 converts the second intermediate-frequency signal supplied from the second frequency mixer 155 into a digital intermediate-frequency signal and supplies it to the following diversity signal adding means 147.

Meanwhile, in the second receiving block 142, the same OFDM radio signal as the signal received by the first receiving block 141 is received at the antenna 158, to carry out the same signal-receiving operation as the signal receiving operation of the first receiving block 141. The digital intermediate-frequency signal outputted from the second receiving block 142 is supplied to the diversity signal adding means 147.

In this case, the first local oscillation signal generated by the first local oscillator 143 is set at a stabilized oscillation frequency under the control of the PLL circuit 144 supplied with the first local oscillation signal and the reference signal outputted from the reference-signal oscillator 145.

Then, in the diversity signal adding means 147, the digital phase shifter 166 phase-shifts the digital intermediate-frequency signal supplied from the first receiving block 141 in a manner as described later while the digital phase shifter 167 phase-shifts the digital intermediate-frequency signal supplied from the second receiving block 142 in a manner as described later. Also, the mutual correlation detector 168 detects a mutual correlation between the digital intermediate-frequency signal supplied from the first receiving block 141 and the digital intermediate-frequency signal supplied from the second receiving block 142, and corrects the respective phase-shift amounts of the digital phase shifters 166, 167 depending upon a result of the detection such that the phase of the digital intermediate-frequency signal outputted from the digital phase shifter 166 and the phase of the digital intermediate-frequency signal outputted from the digital phase shifter 167 are in the same phase. By carrying out such phase correction, the digital intermediate-frequency signal outputted from the digital phase shifter 166 and the digital intermediate-frequency signal outputted from the digital phase shifter 167 are added, in phase, by the adder 169 and outputted as an added digital intermediate-frequency signal.

Thereafter, the OFDM demodulator 148 OFDM-demodulates the added digital intermediate-frequency signal outputted from the diversity signal adding means 147, to supply a demodulated signal to a utilization circuit (not shown) through the demodulated-signal output terminal 149.

According to the OFDM signal receiver, the diversity signal adding means 147 equalizes the phases of the two digital intermediate-frequency signals and adds together these signals to obtain an added digital intermediate-frequency signal. Consequently, the added digital intermediate-frequency signal is maximized in signal power. Thus, it is possible to receive an OFDM radio signal in a preferred reception state.

The known receiver having receiving blocks in plurality, where applied for the vehicular application, can realize a comparatively preferred reception state. However, in the case of the application to a system having a multiplicity of channels as in a cellular phone system or terrestrial-wave television broadcast, the local oscillation signal is considerably broadened in its frequency variation range in order for the local oscillator 56 to cope with the multiplicity of channels. The phase shifters 57, 58, 59 required for obtaining a required phase-shift amount over such a broad frequency variation range increases the cost of manufacture for the local oscillator 56 and phase shifters 57, 58, 59.

Meanwhile, in the receiver of this kind, the wiring of from the local oscillator 56 via the phase shifter 57, 58, 59 to the frequency mixer 62, 66, 70 is made as short as possible in the manufacture of the receiver. However, because the local oscillation signal is high in frequency and moreover a phase shifter 57, 58, 59 is inserted along this wiring route, it is impossible to neglect the signal loss due to the insertion/connection of the phase shifter 57, 58, 59. As a result, a large amount of deterioration exists in the carrier wave vs. noise ratio of demodulated signals (C/N).

As a consequence, a receiver for resolving this problem has already been proposed by the same applicant as the present applicant.

FIG. 6 is a block diagram showing an example of an essential-part configuration of a receiver of the proposal, showing an example that the plurality of receiving blocks are three blocks.

As shown in FIG. 6, the receiver has a first receiving block 72, a second receiving block 73, a third receiving block 74, an adder (ADD) 75, a demodulator (DET) 76, a demodulated-signal output terminal 77, a reference-signal oscillator 78, and three phase shifters 79, 80, 81. In this case, the first receiving block 72 has an antenna 82, a high-frequency amplifier 83, a frequency mixer 84, a local oscillator 85, a PLL circuit (PLL) 86 and an intermediate-frequency filter (FIL) 87. The second receiving block 73 has an antenna 88, a high-frequency amplifier 89, a frequency mixer 90, a local oscillator 91, a PLL circuit (PLL) 92 and an intermediate-frequency filter (FIL) 93. The third receiving block 74 has an antenna 94, a high-frequency amplifier 95, a frequency mixer 96, a local oscillator 97, a PLL circuit (PLL) 98 and an intermediate-frequency filter (FIL) 99.

In the first receiving block 72, the high-frequency amplifier 83 has an input end connected to the antenna 82 and an output end connected to a first input end of the frequency mixer 84. The frequency mixer 84 has a second input end connected to an output end of the local oscillator 85 and an output end connected to an input end of the intermediate-frequency filter 87. The local oscillator 85 has an input end connected to an output end of the PLL circuit 86 and an output end connected to an input end of the PLL circuit 86. The PLL circuit 86 has a control input end connected to an output end of the phase shifter 79. The intermediate-frequency filter 87 has an output end connected to a first input end of the adder 75.

In the second receiving block 73, the high-frequency amplifier 89 has an input end connected to the antenna 88 and an output end connected to a first input end of the frequency mixer 90. The frequency mixer 90 has a second input end connected to an output end of the local oscillator 91 and an output end connected to an input end of the intermediate-frequency filter 93. The local oscillator 93 has an input end connected to an output end of the PLL circuit 92 and an output end connected to an input end of the PLL circuit 92. The PLL circuit 92 has a control input end connected to an output end of the phase shifter 80. The intermediate-frequency filter 93 has an output end connected to a second input end of the adder 75.

In the third receiving block 74, the high-frequency amplifier 95 has an input end connected to the antenna 94 and an output end connected to a first input end of the frequency mixer 96. The frequency mixer 96 has a second input end connected to an output end of the local oscillator 97 and an output end connected to an input end of the intermediate-frequency filter 99. The local oscillator 97 has an input end connected to an output end of the PLL circuit 98 and an output end connected to an input end of the PLL circuit 98. The PLL circuit 98 has a control input end connected to an output end of the phase shifter 81. The intermediate-frequency filter 99 has an output end connected to a third input end of the adder 75.

Meanwhile, the adder 75 has an output end connected to an input end of the demodulator 76. The demodulator 76 has an output end connected to the demodulated-signal output terminal 77. The phase shifters 79, 80, 81 have respective input ends connected to an output end of the reference-signal oscillator 78. The phase shifters 79, 80, 81 have respective control input ends coupled to a control output end of the demodulator 76.

The receiver of the proposal operates generally as follows.

When the same radio signal is received at the three antennas 82, 88, 89, the reception signals are respectively amplified by the high-frequency amplifiers 83, 89, 95 and supplied to the frequency mixers 84, 90, 96. The frequency mixers 84, 90, 96 frequency-mix together the reception signal and the local oscillation signal supplied from the local oscillator 85, 91, 97, to respectively generate frequency-mixed signals. At this time, the PLL circuit 86, 92, 98 phase-controls the local oscillation signal generated by the local oscillator 85, 91, 97 by a reference signal supplied from the reference-signal oscillator 78 through the phase shifter 79, 80, 81, and sets a frequency to the local oscillation signal of the local oscillator 85, 91, 97 depending upon the control result thereof. The intermediate-frequency filter 87, 93, 99 selects an intermediate-frequency signal out of the frequency-mixed signal outputted by the frequency mixer 84, 90, 96, and supplies a selected intermediate-frequency signal to the adder 75. The adder 75 adds/combines together, in phase, the supplied three intermediate-frequency signals to form an added intermediate-frequency signal, and supplies the added intermediate-frequency signal to the demodulator 76. The demodulator 76 demodulates the added intermediate-frequency signal and supplies a demodulated signal to the utilization circuit (not shown) via the demodulated-signal output terminal 77.

At this time also, the demodulator 76 adjusts individually the shift amounts of the phase shifters 79, 80, 81. This causes change in the phase of the reference signal outputted from the phase shifter 79, 80, 81 and in the phase of the local oscillation signal outputted from the local oscillator 85, 91, 97, thereby effecting adjustment such that the added intermediate-frequency signal to be supplied to the adder 75 is maximized in signal power, i.e. such that equalizing the phases of the intermediate-frequency signals to be added/combined in the adder 75. With such adjustment, the added intermediate-frequency signal is maximized in signal power. Thus, radio signals can be received in a preferred state. Meanwhile, because the signal to be phase-shifted by the phase shifter 79, 80, 81 is a reference signal considerably lower in frequency than the local oscillation signal, the manufacturing cost for the phase shifters 79, 80, 81 is not significantly increased. It is possible to neglect the signal loss due to insertion/connection of the phase shifters 79, 80, 81.

However, various problems still exist in the conventional receivers of this kind. In the above circuit, because of the provision of PLL circuits 86, 92, 98 respectively in the first to third receiving blocks 72, 73, 74, setting of the oscillation frequency of the local oscillator 85, 91, 97 in the PLL circuit 86, 92, 98 cannot be established immediately after turning on the power. As a consequence, the local oscillation signal of the local oscillator 85, 91, 97 is not established in phase state and the added intermediate-frequency signal is not maximized in signal power. In order to maximize the signal power in the added intermediate-frequency signal, there is a need to optimally adjust the phase amount of the reference signal on each of the first to third receiving blocks 72, 73, 74. Normal signal reception is not possible in the duration of such optimal adjustment conducted after turning on the power.

It is therefore an object of the present invention to provide a receiver that has a plurality of receiving blocks, each of which has a PLL circuit, and is capable of setting a maximum signal power in an added intermediate-frequency signal immediately after turning on the power.

The known ODFM signal receiver having a plurality of receiving blocks, when applied in vehicular applications, can realize a comparatively preferred reception state. However, this OFDM signal receiver uses the diversity signal adding means 147 for digital signal processing. In configuring the digital phase shifters 166, 167 and mutual correlation detector 168, included is a complex correlator formed by a multiplicity of multipliers, dividers and logic circuits. Even if configured by integrated circuits (ICs), the circuitry in the ICs is complicated, extensive, and results in increased power consumption.

Meanwhile, in the known ODFM signal receiver having a plurality of receiving blocks, the analog circuit portions in the receiving blocks 141, 142 are configured independently of each other. Consequently, the analog circuit portion is enormously complicated as well as extensive, making the entire configuration large-sized and the manufacturing cost high.

An OFDM signal receiver for solving the problems above has been already proposed by the same applicant as the present applicant.

FIG. 12 is a block diagram showing an example of an essential-part configuration of the OFDM signal receiver of the proposal, showing an example the plurality of receiving blocks configure two blocks.

As shown in FIG. 12, the OFDM signal receiver has a first receiving block 170, a second receiving block 171, an adder 172, a second frequency mixer 173, a second local oscillator 174, a second intermediate-frequency filter 175, an analog-digital converter (A/D) 176, an OFDM demodulator (DET) 177, a demodulated-signal output terminal 178, a reference-signal oscillator 179, phase shifters 180, 181, a power detector (PW DET) 182, and a phase control section (CONT) 183. In this case, the first receiving block 170 has an antenna 184, a high-frequency filter 185, a low-noise high-frequency amplifier 186, a first frequency mixer 187, a first local oscillator 188, a PLL circuit (PLL) 189 and a first intermediate-frequency filter 190. The second receiving block 171 has an antenna 191, a high-frequency filter 192, a low-noise high-frequency amplifier 193, a first frequency mixer 194, a first local oscillator 195, a PLL circuit (PLL) 196 and a first intermediate-frequency filter 197.

In the first receiving block 170, the high-frequency filter 185 has an input end connected to the antenna 184 and an output end connected to the low-noise high-frequency amplifier 186. The low-noise high-frequency amplifier 186 has an output end connected to a first input end of the first frequency mixer 187. The first frequency mixer 187 has a second input end connected to an output end of the first local oscillator 188 and an output end connected to an input end of the first intermediate-frequency filter 190. The first local oscillator 188 has an input end connected to an output end of the PLL circuit 189 and an output end connected to an input end of the PLL circuit 189. The PLL circuit 189 has a control input end connected to an output end of the phase shifter 180. The first intermediate-frequency filter 190 has an output end connected to a first input end of the adder 172.

In the second receiving block 171, the high-frequency filter 192 has an input end connected to the antenna 191 and an output end connected to the low-noise high-frequency amplifier 193. The low-noise high-frequency amplifier 193 has an output end connected to a first input end of the first frequency mixer 194. The first frequency mixer 194 has a second input end connected to an output end of the first local oscillator 195 and an output end connected to an input end of the first intermediate-frequency filter 193. The first local oscillator 195 has an input end connected to an output end of the PLL circuit 196 and an output end connected to an input end of the PLL circuit 196. The PLL circuit 196 has a control input end connected to an output end of the phase shifter 181. The first intermediate-frequency filter 197 has an output end connected to a second input end of the adder 172.

Meanwhile, the adder 172 has an output end connected to a first input end of the second frequency mixer 173. The second frequency mixer 173 has a second input end connected to an output end of the second local oscillator 174 and an output end connected to an input end of the second intermediate-frequency filter 175. The second intermediate-frequency filter 175 has an output end connected to an input end of the analog-digital converter 176. The analog-digital converter 176 has an output end connected to an input end of the OFDM demodulator 177 and to an input end of the power detector 182. The ODFM demodulator 177 has an output end connected to the demodulated-signal output terminal 178. The power detector 182 has an output end connected to an input end of the phase control section 183. The phase shifters 180, 181 have respective input ends connected to an output end of the reference-signal oscillator 179. The phase shifters 180, 181 have respective control input ends coupled to a control output end of the phase control section 183.

The OFDM signal receiver of the proposal operates generally as follows.

In case the same one of OFDM radio signal is received at the two antennas 184, 191, the reception signal thereof, after removed of unwanted frequency signal components by the high-frequency filter 185, 192, is amplified by the low-noise high-frequency amplifier 186, 193 and supplied to the first frequency mixer 187, 194. The first frequency mixer 187, 194 mixes together the reception signal and the first local oscillation signal supplied from the first local oscillator 188, 195 to generate a first frequency-mixed signal. At this time, the PLL circuit 189, 196 phase-controls the first local oscillation signal generated by the first local oscillator 188, 195 by means of a reference signal supplied from the reference-signal oscillator 179 through the phase shifter 180, 181, and set a frequency for the first local oscillation frequency signal of the first local oscillator 188, 195 depending on a control result of the same. The first intermediate-frequency filter 190, 197 selects/outputs a first intermediate-frequency signal out of a first frequency-mixed signal outputted by the first frequency mixer 187, 194 and supplies two selected/outputted first intermediate-frequency signals to the adder 172.

The adder 172 adds/combines together, in phase, the two intermediate-frequency signals supplied to form an added first intermediate-frequency signal, and supplies it to the second frequency mixer 173. The second frequency mixer 173 frequency-mixes together the added first intermediate-frequency signal and the second local oscillation signal supplied from the second local oscillator 174 to generate a second frequency-mixed signal. The second intermediate-frequency filter 175 selects/outputs a second intermediate-frequency signal out of the second frequency-mixed signal outputted by the second frequency mixer 173. The analog-digital converter 176 converts the second intermediate-frequency signal supplied from the second intermediate-frequency filter 175 into a digital intermediate-frequency signal and supplies an obtained digital intermediate-frequency signal to the demodulator 177 and power detector 182. The demodulator 177 OFDM-demodulates the digital intermediate-frequency signal and supplies a demodulated signal to a utilization circuit (not shown) through the demodulated-signal output terminal 178. The power detector 182 detects a power amount corresponding to the digital intermediate-frequency signal and supplies a detection result to the phase control section 183. The phase control section 183 individually controls the phase-shift amounts of the phase shifters 180, 181 depending on a detection result from the power detector 182, individually changes the phase-shift amounts of the reference signals to be supplied to the PLL circuits 189, 196, and carries out an adjustment to maximize the power amount to be detected by the power detector 182.

According to the OFDM signal receiver, by controlling the shift amount of the shifter 180, 181 in a manner noted before, the digital intermediate-frequency signal to be OFDM-demodulated by the demodulator 177 is maximized in power amount. It is, accordingly, possible to receive radio signals in a preferred state.

However, while the above receiver is less complex than the conventional OFDM signal receiver, other problems still exist. For example, when fading occurs in an arrival radio wave, it is difficult to improve the bit error rate (BER, i.e. bit error rate) upon extreme level lowering in a particular frequency component within a reception signal band.

It is therefore another object of the present invention to provide an OFDM signal receiver in which the power is at least a predetermined value in a digital intermediate-frequency signal digital-converted from an added intermediate-frequency signal obtained by adding, in phase, reception signals on a plurality of receiving blocks. It is also an object of the present invention to provide an improved bit error rate.

SUMMARY OF THE INVENTION

In order to achieve the foregoing objects, one embodiment of the present invention includes a plurality of receiving blocks. Each receiving block has an antenna, a frequency mixer that frequency-converts a reception signal received at the antenna, a local oscillator that supplies a local oscillation signal to the frequency mixer, a PLL circuit that sets an oscillation frequency of the local oscillator, and an intermediate-frequency circuit that selects an intermediate-frequency signal out of an output frequency-mixed signal of the frequency mixer. The embodiment also contains an adder that adds together output signals of the plurality of receiving blocks, a reproduction processor that reproduces an output added signal of the adder, an adjustable reference-signal generator that supplies phase-shifted reference signals respectively to the PLL circuits of the plurality of receiving blocks, and a plurality of switches connected between the respective PLL circuits and the adjustable reference-signal generator. The switch-on times of the plurality of switches, upon power being supplied to the receiver, are controlled such that the reference signals frequency-divided by the respective PLL circuits are in the same phase. The adjustable reference-signal generator, during steady state operation, adjusts phase shift of the reference signals respectively for supply to the PLL circuits such that output signals of the plurality of receiving blocks are in the same phase and, upon power being supplied to the receiver, the phases are set in an initial phase-shift adjusted state stored immediately before previously turning off the power to the receiver.

According to this embodiment, a phase-shift adjusted state of the adjustable reference-signal generator is stored immediately before turning off the power and remains stored as long as power is not supplied to the receiver. When the power is first supplied to the receiver, the switch-on time in the plurality of switches is controlled and set to adjust the phases of the reference signals frequency-divided in the PLL circuits to the same phase. Because the added intermediate-frequency signal is maximized in signal power, there is no need to optimally adjust a phase-shift amount of the reference signal for each of the plurality of receiving blocks. Thus, normal signal reception is possible in the receiver immediately after turning on the power.

In this case, the adjustable reference-signal generator may contain a reference-signal oscillator common between the plurality of receiving blocks to generate reference signals and a plurality of phase shifters to individually phase-shift the reference signals. With this configuration, the adjustable reference-signal generator can be simplified to reduce the signal loss due to the provision of the plurality of phase shifters.

Also, the adjustable reference-signal generator may contain a plurality of digital synthesizers to generate reference signals individually phase-shifted by being supplied with phase data. With this configuration, because the phase and frequency of the reference signal can be digitally control-processed, control process can be simplified in addition to simplification in configuration of the adjustable reference-signal generator.

Furthermore, there production processor may be configured to, upon turning on of the power to the receiver, carry out control of the switch-on times of the plurality of switches depending on phase comparison signals supplied from the PLL circuits. This permits the reproduction processor to supply phase comparison signals obtained by the PLL circuit. By comparing phase states of supplied phase comparison signals, switch-on time is determined for the plurality of switches. Accordingly, required switch-on time for each switch can be controlled without complicating the configuration of the control system.

Also, the reproduction processor may be connected with a memory that stores the initial phase-shift adjusted state of the adjustable reference-signal generator. The initial phase-shift adjusted state stored in the memory may then be read out when turning on the power, thereby setting the adjustable reference-signal generator to a read-out phase-shift adjusted state.

With this configuration, the reproduction processor stores the initial phase-shift adjusted state of the adjustable reference-signal generator to the memory immediately before turning off the power. When the power is turned on, the phase-shift adjusted state of the adjustable reference signal generator stored in the memory is used, facilitating setting of the adjustable reference-signal generator to the initial phase-shift state and correctly reproducing a phase-shift adjusted state of the adjustable reference-signal generator immediately before turning off the power.

In this case, the reproduction processor is preferably configured to, during steady state operation, update and store the phase-shift adjusted state of the adjustable reference-signal generator to the memory at constant time intervals. With this configuration, because the memory is updated in storage content at a constant time interval, it is possible to use a memory having a small storage capacity.

Also, in order to achieve the foregoing object, a second embodiment of the present invention comprises a plurality of receiving blocks. Each receiving block has an antenna, a frequency mixer that frequency-convertes an OFDM signal received at the antenna, a local oscillator that supplies a local oscillation signal to the frequency mixer, a PLL circuit that sets an oscillation frequency to the local oscillator, and an intermediate-frequency circuit that selects an intermediate-frequency signal out of an output frequency-mixed signal of the frequency mixer. The embodiment further includes an adder that adds together the intermediate frequency signal outputted from the plurality of receiving blocks, an analog-digital converter that converts an added intermediate-frequency signal outputted from the adder into a digital signal, an OFDM demodulator that OFDM-demodulates the digital signal, an adjustable reference-signal generator that supplies phase-shifted reference signals respectively to the PLL circuits of the plurality of receiving blocks, and a phase-shift amount controller connected to the OFDM demodulator to set an amount of phase-shift of the adjustable reference-signal generator such that a demodulated signal of the OFDM demodulator has a power of at least a predetermined value and power dispersion in the demodulated signal is minimized.

According to the above embodiment, in order to supply phase-shifted reference signals respectively to the PLL circuits of the plurality of receiving blocks, the phase-shift amount controller connected to the OFDM demodulator is used to adjust the phase-shift amount of the adjustable reference-signal generator. By carrying out the adjustment, the demodulated signal of the OFDM demodulator is increased in power to a predetermined value or higher and the signal dispersion of the demodulated signal is minimized. Accordingly, preferred signal reception is possible similar to the conventional OFDM signal receiver of this kind. Furthermore, signal reception with minimal bit error rate is possible.

In this case, the adjustable reference-signal generator may comprise a reference-signal oscillator common between the plurality of receiving blocks to generate reference signals and a plurality of phase shifters to individually phase-shift the reference signals. With this configuration, the adjustable reference-signal generator can be simplified in configuration and the signal loss due to the provision of a plurality of phase shifters can be reduced.

Also, the adjustable reference-signal generator may comprise a plurality of digital synthesizers to generate reference signals individually phase-shifted by being supplied with phase data. With this configuration, because the phase and frequency of the reference signal can be digitally control-processed, control process can be simplified in addition to simplification in configuration of the adjustable reference-signal generator.

Furthermore, the phase-shift amount controller may include a power detector for a demodulated signal of the OFDM demodulator and a power dispersion detector for a demodulated signal of the OFDM demodulator. With this configuration, power detection and dispersion detection from a demodulated signal can be individually made without interference between the both detections.

Also, the embodiment may further comprise, between the adder and the analog-digital converter, a second frequency mixer that frequency-converts the added intermediate-frequency signal into a second intermediate-frequency signal, a second local oscillator that supplies a second local oscillation signal to the second frequency mixer, and a second intermediate-frequency circuit that selects a second intermediate-frequency signal out of an output frequency-mixed signal of the second frequency mixer.

With this configuration, the receiver is configured in a double super heterodyne structure. Accordingly, the first and second local oscillation signals can be selected with respective frequency bands comparatively freely.

In another embodiment, a method of maximizing output signal power while minimizing signal dispersion of a receiver when power is first supplied to the receiver after power to the receiver has been terminated comprises storing an initial phase-shift adjusted state of an adjustable reference-signal generator immediately before power to the receiver has been terminated, supplying phase-shifted reference signals to PLL circuits of a plurality of receiving blocks of the receiver via the adjustable reference-signal generator when power is supplied to the receiver, adjusting a phase shift of the reference signals such that when power is first supplied to the receiver after power to the receiver has been terminated the reference signals are set to the initial phase-shift adjusted state, controlling reference signals frequency-divided by the PLL circuits to have the same phase upon first supplying power to the receiver and adjusting a phase shift of the reference signals such that output signals of the receiving blocks have the same phase during steady state operation.

The method may further comprise controlling switch-on times of switches connected between the PLL circuits and the adjustable reference-signal generator such that the reference signals frequency-divided by the PLL circuits have the same phase upon first supplying power to the receiver.

The switches may be controlled by generating and comparing phase comparison signals from the PLL circuits, determining phases of the phase comparison signals, taking the phase comparison signal delayed greatest in phase as a reference phase comparison signal, determining a phase difference between the phase comparison signals and the reference phase comparison signal, and grounding each switch for a time that corresponds to the particular phase difference associated with that switch.

The method may further comprise detecting power of a demodulated signal from the receiver, determining a phase difference between reference signals outputted from phase shifters, searching for a first phase difference at which maximum power of the demodulated signal is obtained, and adjusting an amount of phase-shift of the phase shifters such that the phase difference is set to the first phase difference, after the amount of phase-shift has been adjusted, measuring power and signal dispersion of the demodulated signal at the first phase difference, changing the phase difference between the reference signals by a preset amount to one of an increased phase difference and a decreased phase difference and measuring power of the demodulated signal at each of the increased and decreased phase differences, and determining whether the power measured at each of the first, increased, and decreased phase difference is smaller than a power difference of the maximum power less a predetermined amount, when the power measured at the first phase difference is not smaller than the power difference, detecting a signal dispersion value of the demodulated signal at the first phase difference and each of the increased and decreased phase difference, if any of the detected signal dispersion values are less than a preset signal dispersion value setting the preset signal dispersion value to the smaller signal dispersion value; and repeating measurements of the power and signal dispersion value at various phase differences until power is no longer supplied to the receiver.

The method may further comprise updating and storing the phase-shift adjusted state of the adjustable reference-signal generator when the receiver reaches steady state operation.

BRIEF DESCRIPTION OF THE DRAWINGS

FIG. 9 is a signal waveform diagram showing an example of two demodulated signals different in signal dispersion degree and a transmission signal as an original signal of the demodulated signal;

FIG. 10 is a block diagram showing an example of adjustable reference-signal generator of a digital synthesizer configuration;

DETAILED DESCRIPTION OF THE PREFERRED EMBODIMENTS

Embodiments of the present invention will now be explained with reference to the drawings.

Figure 1:
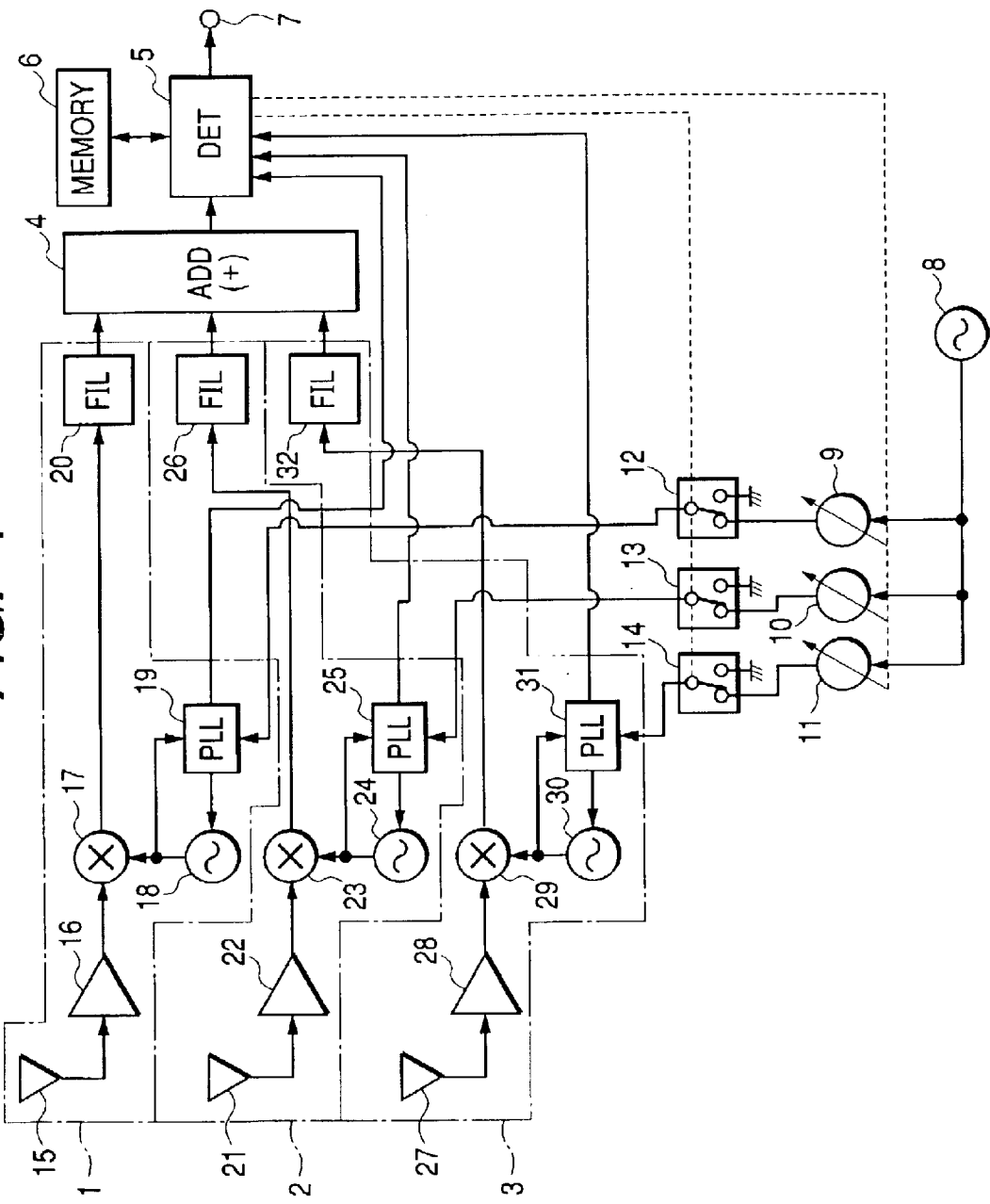
FIG. 1 is a block diagram showing an essential-part configuration of a receiver having a plurality of receiving blocks, showing one embodiment of a receiver according to the invention.

FIG. 1 is a block diagram showing an essential-part configuration of a receiver having a plurality of receiving blocks according to the invention. As shown, the plurality of receiving blocks comprises three blocks, however, as discussed below, any number of receiving blocks may exist.

As shown in FIG. 1, the receiver of this embodiment has a first receiving block 1, a second receiving block 2, a third receiving block 3, an adder (ADD) 4, a reproduction processing section (DET) 5 (reproduction processor), a memory 6, a demodulated-signal output terminal 7, a reference-signal oscillator 8, three phase shifters 9, 10, 11, and three one-circuit two-contact switches 12, 13, 14. In this case, the first receiving block 1 has an antenna 15, a high-frequency amplifier 16, a frequency mixer 17, a local oscillator 18, a PLL circuit (PLL) 19 and an intermediate-frequency filter (FIL) 20. The second receiving block 2 has an antenna 21, a high-frequency amplifier 22, a frequency mixer 23, a local oscillator 24, a PLL circuit (PLL) 25 and an intermediate-frequency filter (FIL) 26. The third receiving block 3 has an antenna 27, a high-frequency amplifier 28, a frequency mixer 29, a local oscillator 30, a PLL circuit (PLL) 31 and an intermediate-frequency filter (FIL) 32.

In the first receiving block 1, the high-frequency amplifier 16 has an input end connected to the antenna 15 and an output end connected to a first input end of the frequency mixer 17. The frequency mixer 17 has a second input end connected to an output end of the local oscillator 18 and an output end connected to an input end of the intermediate-frequency filter 20. The local oscillator 18 has an input end connected to an output end of the PLL circuit 19 and an output end connected to an input end of the PLL circuit 19. The PLL circuit 19 has a control input end connected to a movable contact of the switch 12 and frequency-divided signal output end connected to a first control end of the demodulator 5. The intermediate-frequency filter 20 has an output end connected to a first input end of the adder 4.

In the second receiving block 2, the high-frequency amplifier 22 has an input end connected to the antenna 21 and an output end connected to a first input end of the frequency mixer 23. The frequency mixer 23 has a second input end connected to an output end of the local oscillator 24 and an output end connected to an input end of the intermediate-frequency filter 26. The local oscillator 24 has an input end connected to an output end of the PLL circuit 25 and an output end connected to an input end of the PLL circuit 25. The PLL circuit 25 has a control input end connected to a movable contact of the switch 13 and frequency-divided signal output end connected to a second control end of the demodulator 5. The intermediate-frequency filter 26 has an output end connected to a second input end of the adder 4.

In the third receiving block 3, the high-frequency amplifier 28 has an input end connected to the antenna 27 and an output end connected to a first input end of the frequency mixer 29. The frequency mixer 29 has a second input end connected to an output end of the local oscillator 30 and an output end connected to an input end of the intermediate-frequency filter 32. The local oscillator 30 has an input end connected to an output end of the PLL circuit 31 and an output end connected to an input end of the PLL circuit 31. The PLL circuit 31 has a control input end connected to a movable contact of the switch 14 and frequency-divided signal output end connected to a third control end of the demodulator 5. The intermediate-frequency filter 32 has an output end connected to a third input end of the adder 4.

Meanwhile, the adder 4 has an output end connected to an input end of the reproduction processing section 5. The reproduction processing section 5 is connected to the memory 6, and has an output end connected to a demodulated-signal output terminal 7. The switches 12, 13, 14 have one fixed contacts respectively connected to output ends of the phase shifters 9, 10, 11, and the other fixed contacts each grounded. The phase shifters 9, 10, 11 have respective input ends connected to an output end of the reference-signal oscillator 8 and control input ends coupled to a control output end of the reproduction processing section 5.

Figure 2:
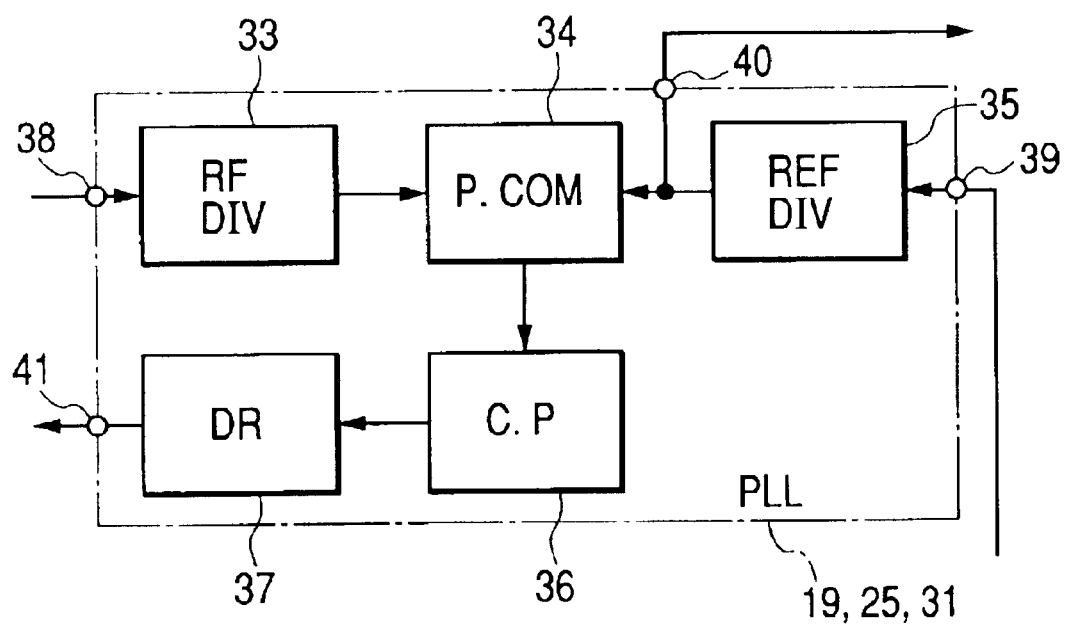
FIG. 2 is a block diagram showing an internal configuration of a PLL circuit used in the receiver shown in FIG. 1.

FIG. 2 is a block diagram showing an internal configuration of the PLL circuit 19, 25, 31 used in the receiver shown in FIG. 1.

Incidentally, because the PLL circuits 19, 25, 31 have the same configuration and operate in a similar manner, the configuration and operation of only the PLL circuit 19 is explained below.

As shown in FIG. 2, the PLL circuit 19 has a local-oscillation signal frequency divider (RF DIV) 33, a phase comparator (P. COM) 34, a reference-signal frequency divider (REF DIV) 35, a charge pump (C. P) 36, a control signal driver (DR) 37, a local-oscillation signal input terminal 38, a reference signal input terminal 39, a phase-comparison signal output terminal 40 and a control signal output terminal 41.

The local-oscillation signal frequency divider 33 has an input end connected to a local-oscillation signal input terminal 38 and an output end connected to a first input terminal of the phase comparator 34. The phase comparator 34 has a second input end connected to an output end of the reference signal frequency divider 35 and an output end connected to an input end of the charge pump 36. The reference signal frequency divider 35 has an input end connected to a reference signal input end 39 and an output end connected to the phase-comparison signal output terminal 40. The charge pump 36 has an output end connected to an input end of the control signal driver 36. The control signal driver 37 has an output end connected to the control signal output terminal 41. The local-oscillation signal input terminal 38 is connected to the output end of the local oscillator 18. The reference signal input terminal 39 is connected to the movable contact of the switch 12. The phase-comparison signal output terminal 40 is connected to a first control end of the reproduction processing section 5 while the control signal output terminal 41 is connected to the control terminal of the local oscillator 18.

In this case, the reference-signal frequency divider 35 frequency-divides a local oscillation signal supplied from the local oscillator 18 through the local-oscillation signal input terminal 38, and supplies a frequency-divided local oscillation signal to the phase comparator 34. The reference-signal frequency divider 35 frequency-divides a reference signal supplied from the reference-signal oscillator 8 through the reference-signal input terminal 39 via the phase shifter 9 and switch 12, and supplies a frequency-divided reference signal to the phase comparator 34. The phase comparator 34 compares the phases of the frequency-divided local oscillation signal and frequency-divided reference signal to detect a phase difference signal thereof, and supplies a detected phase difference signal to the charge pump 36. The charge pump 36 converts the supplied phase difference signal into a charge amount and generates a control signal having a voltage value commensurate with that charge amount, to supply an obtained control signal to the control signal driver 37. The control signal driver 37 provides the supplied control signal to the local oscillator 18 through the control signal output terminal 41, thereby controlling the phase of a local oscillation signal oscillated by the local oscillator 18. Incidentally, the frequency-divided reference signal outputted from the reference-signal frequency divider 35, in part, is supplied as a phase-comparison signal to the reproduction processing section 5 through the phase-comparison signal output terminal 40 as referred later.

Figure 3:
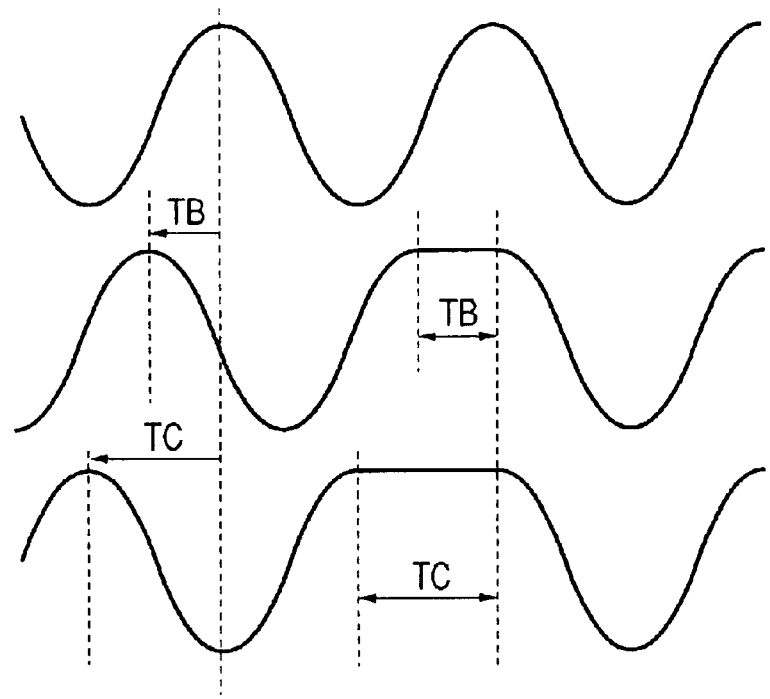
FIG. 3 is a signal waveform diagram showing an example of a state of a phase comparison signal supplied from the PLL circuit to a demodulator during power-on of the receiver shown in FIG. 1.

FIG. 3 is a signal waveform diagram showing phase comparing signals respectively to be supplied from the PLL circuits 19, 25, 31 to the reproduction processing circuit 5 during power-on to the receiver of FIG. 1.

Figure 4:
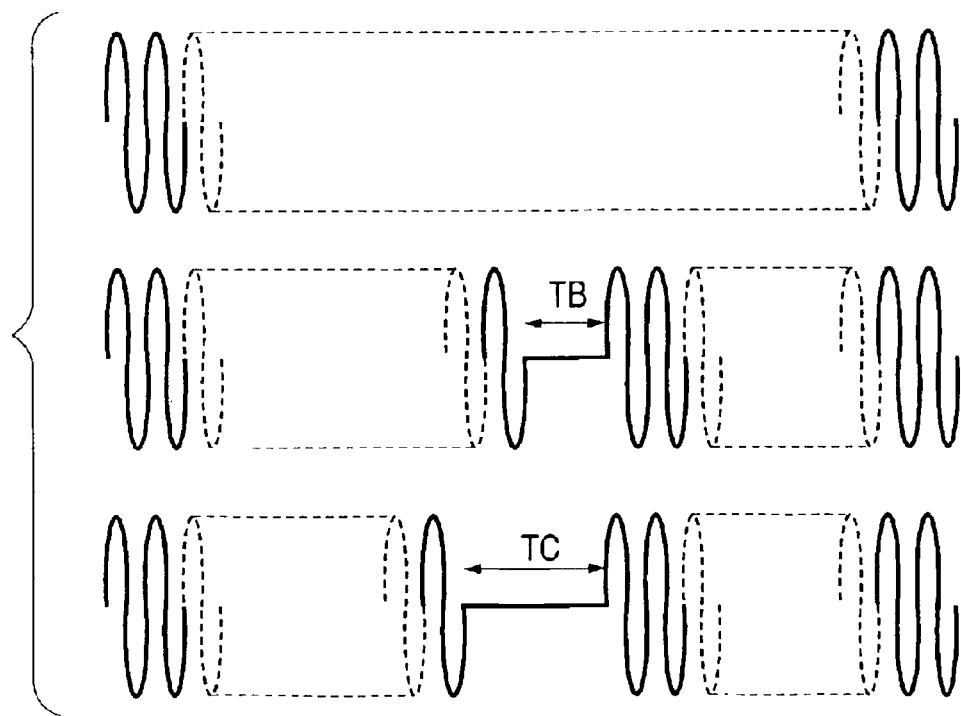
FIG. 4 is a signal waveform diagram showing an example of a state of a reference signal supplied to the PLL circuit when the switches are controlled in switch-on time during power-on of the receiver shown in FIG. 1.
Figure 5:
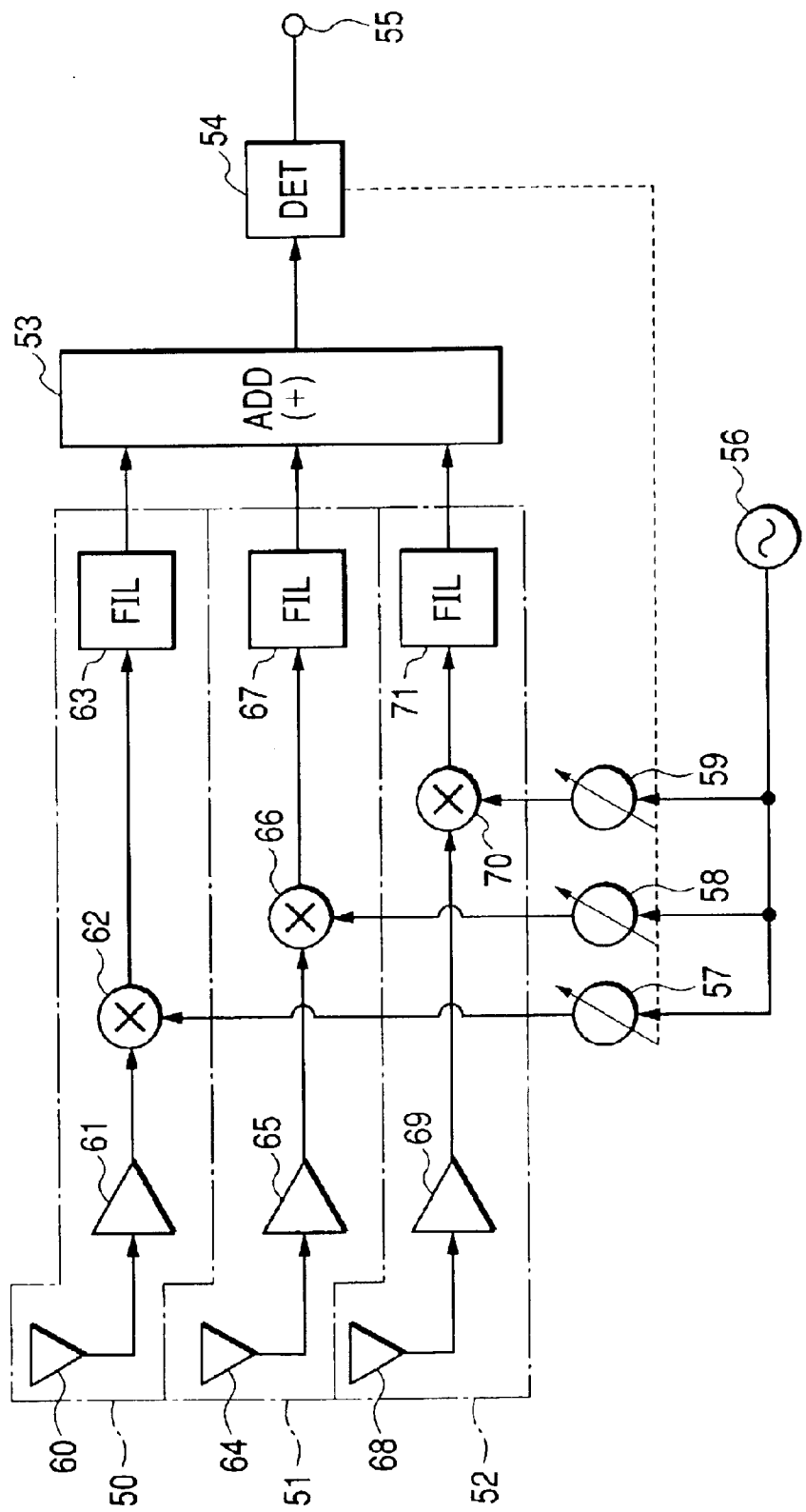
FIG. 5 is a block diagram showing an example of an essential-part configuration of a known receiver having a plurality of receiving blocks.
Figure 6:
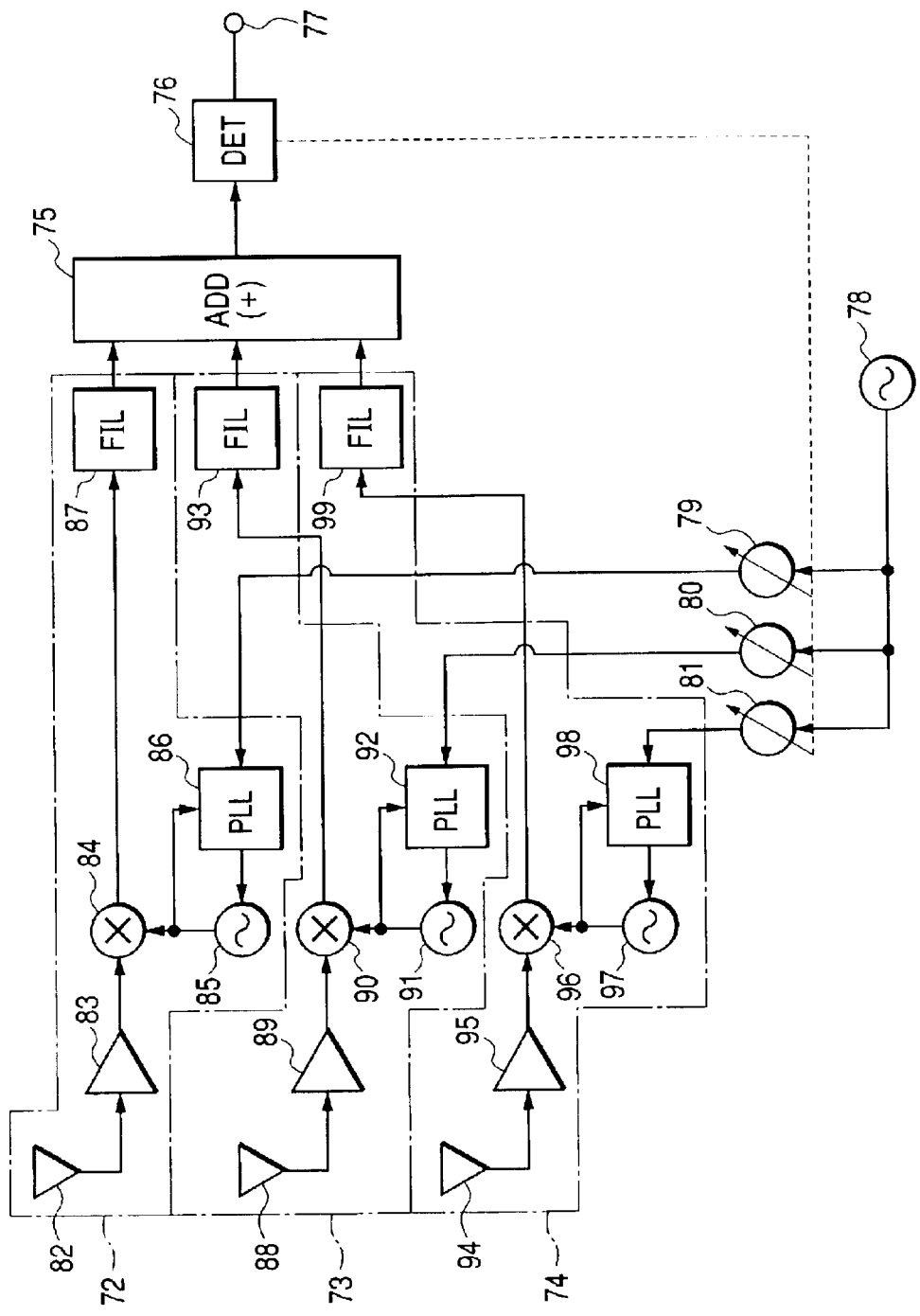
FIG. 6 is a block diagram showing an example of an essential-part configuration of a receiver already proposed.

Meanwhile, FIG. 4 is a signal waveform diagram showing reference signals to be supplied to the PLL circuits 19, 25, 31 when the switches 12, 13, 14 are controlled in switch-on time during power-on to the receiver of FIG. 1.

In FIGS. 3 and 4, the horizontal axis is representative of time while the vertical axis is of signal amplitude. The signal waveform in the upper trace relates to the PLL circuit 19, the signal waveform in the middle trace to the PLL circuit 25, and the signal waveform in the lower trace to the PLL circuit 31.

The operation of the receiver of this embodiment thus configured is explained by using the block diagrams shown in FIGS. 1 and 2 and signal waveform diagrams shown in FIGS. 3 and 4.

First the steady state operation of the receiver is described. In the steady state operation, the movable contact of each switch 12, 13, 14 is on the fixed-contact end (non-grounded end), wherein the switches 12, 13, 14 are on-state.

When the same radio signal is received by the three antennas 15, 21, 27, the reception signals are respectively amplified by the high-frequency amplifiers 16, 22, 28 and supplied to the frequency mixers 17, 23, 29. At this time, the frequency mixer 17 frequency-mixes together the reception signal supplied from the high-frequency amplifier 16 and the local oscillation signal supplied from the local oscillator 18, to generate a frequency-mixed signal thereof. Also, the frequency mixer 23 frequency-mixes together the reception signal supplied from the high-frequency amplifier 22 and the local oscillation signal supplied from the local oscillator 24, to generate a frequency-mixed signal thereof. Similarly, the frequency mixer 29 frequency-mixes together the reception signal supplied from the high-frequency amplifier 28 and the local oscillation signal supplied from the local oscillator 30, to generate a frequency-mixed signal thereof. The intermediate-frequency filter 20, 26, 32 selects an intermediate-frequency signal out of the frequency-mixed signal outputted from the frequency mixer 17, 23, 29, and supplies a selected intermediate-frequency signal to the adder 4. The adder 4 adds/combines together, in phase, the supplied three intermediate-frequency signals to form an added intermediate-frequency signal, and supplies this added intermediate-frequency signal to the reproduction processing section 5. The reproduction processing section 5 demodulates the added intermediate-frequency signal and supplies a demodulated signal to the utilization circuit (not shown) via the demodulated-signal output terminal 7.

At this time, the reproduction processing section 5 individually adjusts the shift amounts of the phase shifters 9, 10, 11 to which a reference signal is supplied from the reference-signal oscillator 8, and changes the phases of the respective reference signals outputted from the phase shifters 9, 10, 11, thereby changing the phases of the reference signals for supply to the corresponding PLL circuits 19, 25, 31. By changing the phases of the local oscillation signals of the local oscillators 18, 24, 30 to be controlled in phase by the PLL circuits 19, 25, 31, adjustment is made such that an added intermediate-frequency signal is maximized in signal power, i.e. such that the intermediate-frequency signals to be added/combined by the adder 4 are in phase with one another. By carrying out such adjustment in the reproduction processing section 5, the added intermediate-frequency signal is maximized in signal power. Thus, radio signals can be received in a preferred state.

In this case, the reproduction processing section 5, when the receiver is in steady state operation, stores at a constant time interval, e.g. every 1 second, the phase-shift adjusted state set on the phase shifter 9, 10, 11 to the memory 6 connected to the demodulator 5. The storage content of the memory 6 is renewed by storing the next phase-shift adjusted state. Consequently, the recent phase-shift adjusted state of the phase shifters 9, 10, 11 is stored in the memory 6. Accordingly, when the use of the receiver is over and its power is turned off, a phase-shift adjusted state of the phase shifters 9, 10, 11 is stored to the memory 6 immediately before turning off the power to the receiver. This phase-shift adjusted state stored to the memory immediately before power to the receiver is turned off is called the initial phase-shift adjusted state for reasons provided below.

The operation state when power is first supplied to the receiver (after the receiver has been turned off) is described below, i.e. when power is turned on in order to re-use the receiver. When power to the receiver is turned on, initially the switches 12, 13, 14 at their movable contacts are changed to one fixed contact ends (non-grounded ends) whereby the switches 12, 13, 14 are in on-state.

Immediately after turning on the power to the receiver, the reproduction processing section 5 supplies a reset signal to the phase shifters 9, 10, 11. This resets the phase-shift adjusted state of the phase shifters 9, 10, 11. Thereafter, when the reference-signal oscillator 8 generates a reference signal, the reference signal is supplied to the PLL circuits 19, 25, 31 respectively through the reset phase shifters 9, 10, 11 and on-state switches 12, 13, 14. The PLL circuit 19 frequency-divides the supplied reference signal by the reference-signal frequency divider 35, to supply an obtained frequency-divided reference signal as a first phase comparison signal from the phase-comparison signal output terminal 40 to a first control end of the reproduction processing section 5. The other PLL circuits 25, 31 operate similarly to the PLL circuit 19, to supply second and third phase comparison signals respectively to the second control end of the demodulator 5 and the third control end of the reproduction processing section 5.

At this time, the reproduction comparing section 5 compares the phases of the first to third phase comparison signals supplied. Of the first to third phase comparison signals, the phase comparison signal delayed greatest in phase is taken as a reference phase comparison signal. In the example illustrated in FIG. 3, the first phase comparison signal shown in the upper trace is taken as the reference phase comparison signal. The reference phase comparison signal is to determine a phase delay (phase difference) of the second phase comparison signal relative to the reference phase comparison signal and a phase delay (phase difference) of the third phase comparison signal relative to the reference phase comparison signal. These are illustrated in FIG. 3 as the phase difference TB shown in the middle trace and the phase difference TC shown in the lower trace, respectively.

The reproduction processing section 5, after the phase difference TB of the second phase comparison signal and the phase difference TC of the third phase comparison signal has been determined, supplies individual switch control signals to the switches 12, 13, 14. Keeping the switch 12 in on-state, the switch 13 is changed over, at its movable contact, to the other fixed contact end (grounded end) to place the switch 13 in off-state for a time corresponding to the phase difference TB.

Similarly, the switch 14 is changed over, at its movable contact, to the other fixed contact end (grounded end) to place the switch 14 in off-state for a time corresponding to the phase difference TC. At this time, to the PLL circuit 19 is supplied a reference signal in a state free of discontinuations as shown in the upper trace of FIG. 4. A reference signal is supplied to the PLL circuit 25 that contains a signal-cease portion for a time corresponding to the phase difference TB, as shown in the middle trace of FIG. 4. Similarly, a reference signal is supplied to the PLL circuit 31 that contains a signal-cease portion for a time corresponding to the phase difference TC as shown in the lower trace of FIG. 4. With switching performed on the switches 12, 13, 14 in this manner, the first to third phase comparison signals respectively outputted from the PL circuits 19, 25, 31 have the same phase.

Next, the reproduction processing section 5 reads out the initial phase-shift adjusted state of the phase shifters 9, 10, 11 stored in the memory 6, and sets the phase shifters 9, 10, 11 to the same adjustment state as the corresponding read-out phase-shift state. When the phase shifters 9, 10, 11 have been set to such states, the power-on operation state terminates to subsequently enter steady state operation discussed above.

In this manner, according to the receiver of this embodiment, the initial phase-shift adjusted state of the phase shifters 9, 10, 11 is stored immediately before turning off the power to the receiver. When the power is turned on, the switches 12, 13, 14 are controlled such that the reference signals (phase comparison signals) frequency-divided by the PLL circuits 19, 25, 31 have the same phase. Because the phase shifters 9, 10, 11 are set in the initial phase-shift adjusted state stored immediately before turning off the power, the added intermediate-frequency signal is maximized in signal power. Accordingly, there is no need to optimally adjust for a phase-shift amount of reference signal to each of the plurality of receiving blocks 1, 2, 3. The receiver is allowed to normally receive signals immediately after turning on the power.

Although in the receiver of the above embodiment, a common reference signal oscillator 8 and a plurality (three) of phase shifters 9, 10, 11 were used for the adjustable reference-signal generator, the receiver of the invention is not limited to an adjustable reference-signal generator that uses a common reference signal oscillator 8 and a plurality of (three) phase shifters 9, 10, 11. For example, a plurality of digital synthesizers for generating reference signals individually phase-shifted due to supply of phase data from the reproduction processing section 5 may be used.

The digital synthesizers used in such an embodiment, may each incorporate a ROM that stores one period of sinusoidal wave data digitized together with amplitude and phase. This data may then be inputted commonly by clock signals and frequency data to generate, from each ROM, sinusoidal wave data with the same frequency and synchronized with the clock signal. The digital synthesizers may thus be independently inputted in digital-formed phase data. Phase setting is performed according to the sinusoidal wave data for output by using the phase data. The respective sinusoidal wave data outputted from the digital synthesizers may then be independently converted into analog sinusoidal wave signals by analog-digital converters. Thereafter, after removal of unwanted signal components individually by band-pass filters, the wave signals may then be individually supplied as phase-shifted reference signals to the corresponding PLL circuits 19, 25, 31. Using such digital synthesizers simplifies the control process.

Furthermore, in the receiver of the embodiment shown in FIG. 1, the phase-shift adjusted state of the phase shifters 9, 10, 11 stored in the memory 6 were acquired at a constant time interval. However, the phase-shift adjusted state of the phase shifters 9, 10, 11 stored in the memory 6 may be acquired at arbitrary time periods or, provided that there is an adequate supply of storage capacity in the memory 6, it may be acquired continuously. Additionally, although the memory 6 was described above as an independent memory connected to the demodulator 5, it may also be an incorporated memory in the demodulator 5.

Figure 7:
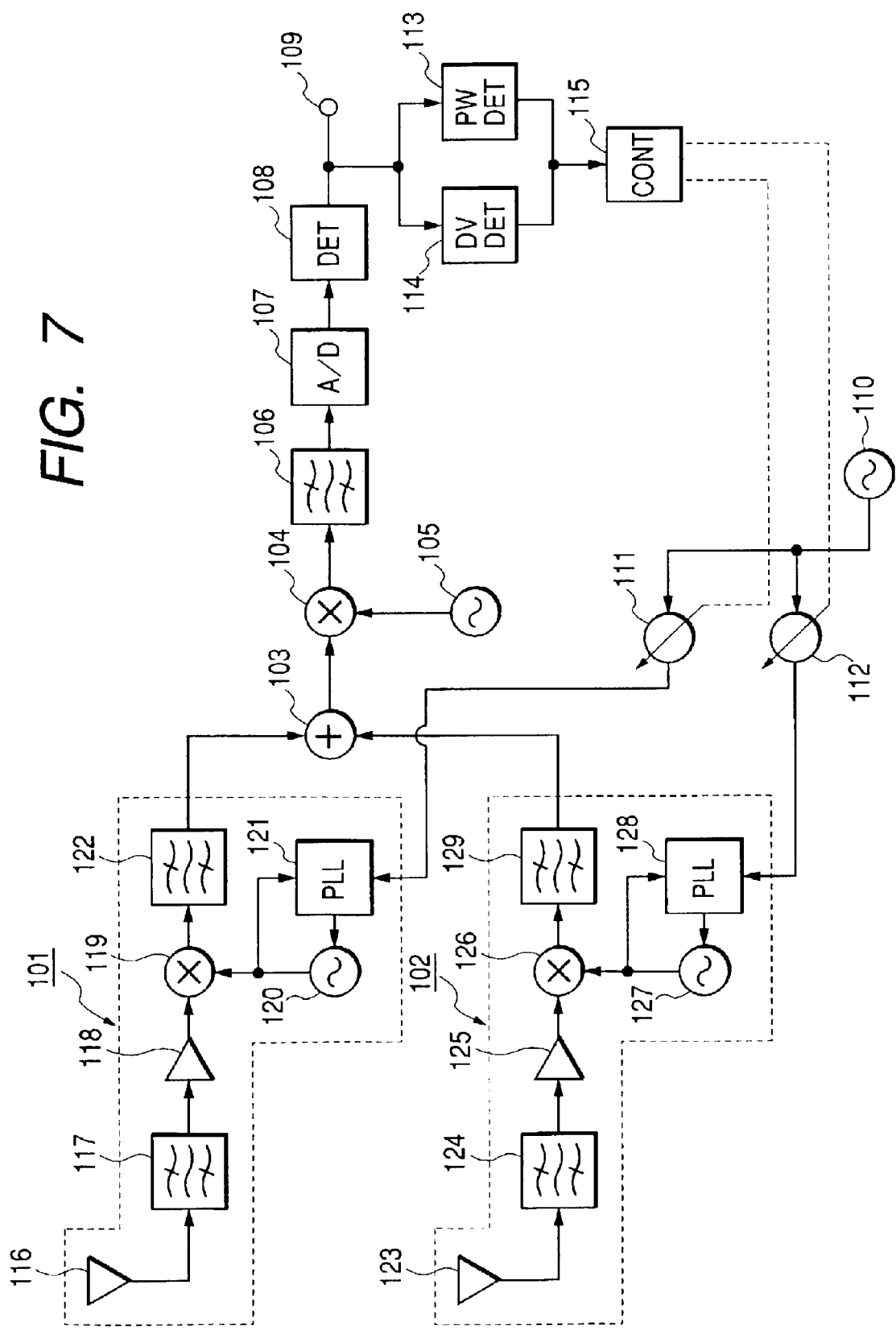
FIG. 7 is a block diagram showing an essential-part configuration according to an embodiment of an ODFM signal receiver of the invention.

FIG. 7 is a block diagram showing an essential-part configuration of an embodiment of an OFDM signal receiver according to the invention, showing an example in which two receiving blocks are used, rather than three receiving blocks.

As shown in FIG. 7, the OFDM signal receiver of this embodiment has a first signal receiving block 101, a second signal receiving block 102, an adder 103, a second frequency mixer 104, a second local oscillator 105, a second intermediate-frequency filter 106, an analog-digital converter (A/D) 107, an OFDM demodulator (DET) 108, a demodulated-signal output terminal 109, a reference-signal oscillator 110, phase shifters 111, 112, a power detector (PW DET) 113, a dispersion detector (DV DET) 114, and a phase control section (CONT) 115. In this case, the section formed by the reference-signal oscillator 110 and the shifters 111, 112 constitutes adjustable reference-signal generator while the section formed by the power detector 113, the dispersion detector 114 and the phase control section 115 constitutes phase-shift amount controller.

Also, the first receiving block 101 has an antenna 116, a high-frequency filter 117, a low-noise high-frequency amplifier 118, a first frequency mixer 119, a first local oscillator 120, a PLL circuit (PLL) 121 and a first intermediate-frequency filter 122. The second receiving block 102 has an antenna 123, a high-frequency filter 124, a low-noise high-frequency amplifier 125, a first frequency mixer 126, a first local oscillator 127, a PLL circuit (PLL) 128 and a first intermediate-frequency filter 129.

In the first receiving block 101, the high-frequency filter 117 has an input end connected to the antenna 116 and an output end connected to the low-noise high-frequency amplifier 118. The low-noise high-frequency amplifier 118 has an output end connected to a first input end of the first frequency mixer 119. The first frequency mixer 119 has a second input end connected to an output end of the first local oscillator 120 and an output end connected to an input end of the first intermediate-frequency filter 122. The first local oscillator 120 has an input end connected to an output end of the PLL circuit 121 and an output end connected to an input end of the PLL circuit 121. The PLL circuit 121 has a control input end connected to an output end of the phase shifter 111. The first intermediate-frequency filter 122 has an output end connected to a first input end of the adder 103.

In the second receiving block 102, the high-frequency filter 124 has an input end connected to the antenna 123 and an output end connected to the low-noise high-frequency amplifier 125. The low-noise high-frequency amplifier 125 has an output end connected to a first input end of the first frequency mixer 126. The first frequency mixer 126 has a second input end connected to an output end of the first local oscillator 127 and an output end connected to an input end of the first intermediate-frequency filter 129. The first local oscillator 127 has an input end connected to an output end of the PLL circuit 128 and an output end connected to an input end of the PLL circuit 128. The PLL circuit 128 has a control input end connected to an output end of the phase shifter 112. The first intermediate-frequency filter 129 has an output end connected to a second input end of the adder 103.

Meanwhile, the adder 103 has an output end connected to a first input end of the second frequency mixer 104. The second frequency mixer 104 has a second input end connected to an output end of the second local oscillator 105 and an output end connected to an input end of the second intermediate-frequency filter 106. The second intermediate-frequency filter 106 has an output end connected to an input end of the analog-digital converter 107. The analog-digital converter 107 has an output end connected to an input end of the OFDM demodulator 108, to an input end of the power detector 113 and to an input end of the dispersion detector 114. The ODFM demodulator 108 has an output end connected to a demodulated-signal output terminal 109. The power detector 113 and the dispersion detector 114 have their output ends connected to an input end of the phase control section 115. The phase shifters 111, 112 have respective input ends coupled to an output end of the reference-signal oscillator 110 and control input ends connected to a control output end of the phase control section 115.

The OFDM signal receiver of this embodiment having the above configuration, generally, operates as follows.

In the first receiving block 101, in case an OFDM radio signal is received at the antenna 116, the reception signal, after removal of unwanted frequency signal components by the high-frequency filter 117, is amplified by the low-noise high-frequency amplifier 118 and supplied to the first frequency mixer 119. The first frequency mixer 119 frequency-mixes together this reception signal and the first local oscillation signal supplied from the first local oscillator 120, to generate a first frequency-mixed signal. At this time, the PLL circuit 120 controls the phases of the first local oscillation signal generated by the first local oscillator 120, by means of a reference signal supplied from the reference-signal oscillator 110 through the phase shifter 111. By a control signal obtained as a result of the phase control, frequency (phase) setting is made to a first local oscillation signal of the first local oscillator 120. The phase-shift amount of the reference signal in the phase shifter 111 will be described later. The first intermediate-frequency filter 122 selects/outputs a first intermediate-frequency signal out of a first frequency-mixed signal outputted by the first frequency mixer 119 and supplies a selected/outputted first intermediate-frequency signal to the adder 103.

Meanwhile, in the second receiving block 102, if the same OFDM signal received by the first receiving block 101 is received at the antenna 123, the reception signal, after removal of unwanted frequency signal components by the high-frequency filter 124, is amplified by the low-noise high-frequency amplifier 125 and supplied to the first frequency mixer 126. The first frequency mixer 126 mixes together this reception signal and the first local oscillation signal supplied from the first local oscillator 127 to generate a first frequency-mixed signal. At this time, the PLL circuit 128 also controls the phases of the first local oscillation signal generated by the first local oscillator 127, by means of a reference signal supplied from the reference-signal oscillator 110 through the phase shifter 112. By a control signal obtained as a result of the phase control, frequency (phase) setting is performed by a first local oscillation signal of the first local oscillator 127. The phase-shift amount of the reference signal in the phase shifter 112 will be described later. The first intermediate-frequency filter 129 selects/outputs a first intermediate-frequency signal out of a first frequency-mixed signal outputted by the first frequency mixer 126 and supplies a selected/outputted first intermediate-frequency signal to the adder 103.

The adder 103 adds/combines together, in phase, the two intermediate-frequency signals respectively supplied from the first and second receiving blocks 101, 102 to form an added first intermediate-frequency signal, and supplies the added first intermediate-frequency signal to the second frequency mixer 104. The second frequency mixer 104 frequency-mixes together the added first intermediate-frequency signal and the second local oscillation signal supplied from the second local oscillator 105 to generate a second frequency-mixed signal, and supplies this second frequency-mixed signal to the second intermediate-frequency filter 106. The second intermediate-frequency filter 106 selects/outputs a second intermediate-frequency signal out of the supplied second frequency-mixed signal and supplies an obtained second intermediate-frequency signal to the analog-digital converter 107. The analog-digital converter 107 converts the supplied second intermediate-frequency signal into a digital intermediate-frequency signal and supplies an obtained digital intermediate-frequency signal to the demodulator 108. The demodulator 108 OFDM-demodulates the digital intermediate-frequency signal and supplies a demodulated signal to a utilization circuit (not shown) through the demodulated-signal output terminal 109, simultaneously supplying the demodulated signal to the power detector 113 and dispersion detector 114.

The power detector 113 detects a power amount corresponding to the demodulated signal and supplies a detection result to the phase control section 115. The dispersion detector 114 detects signal dispersion in the demodulated signal and supplies a detection result to the phase control section 115.

Figure 8:
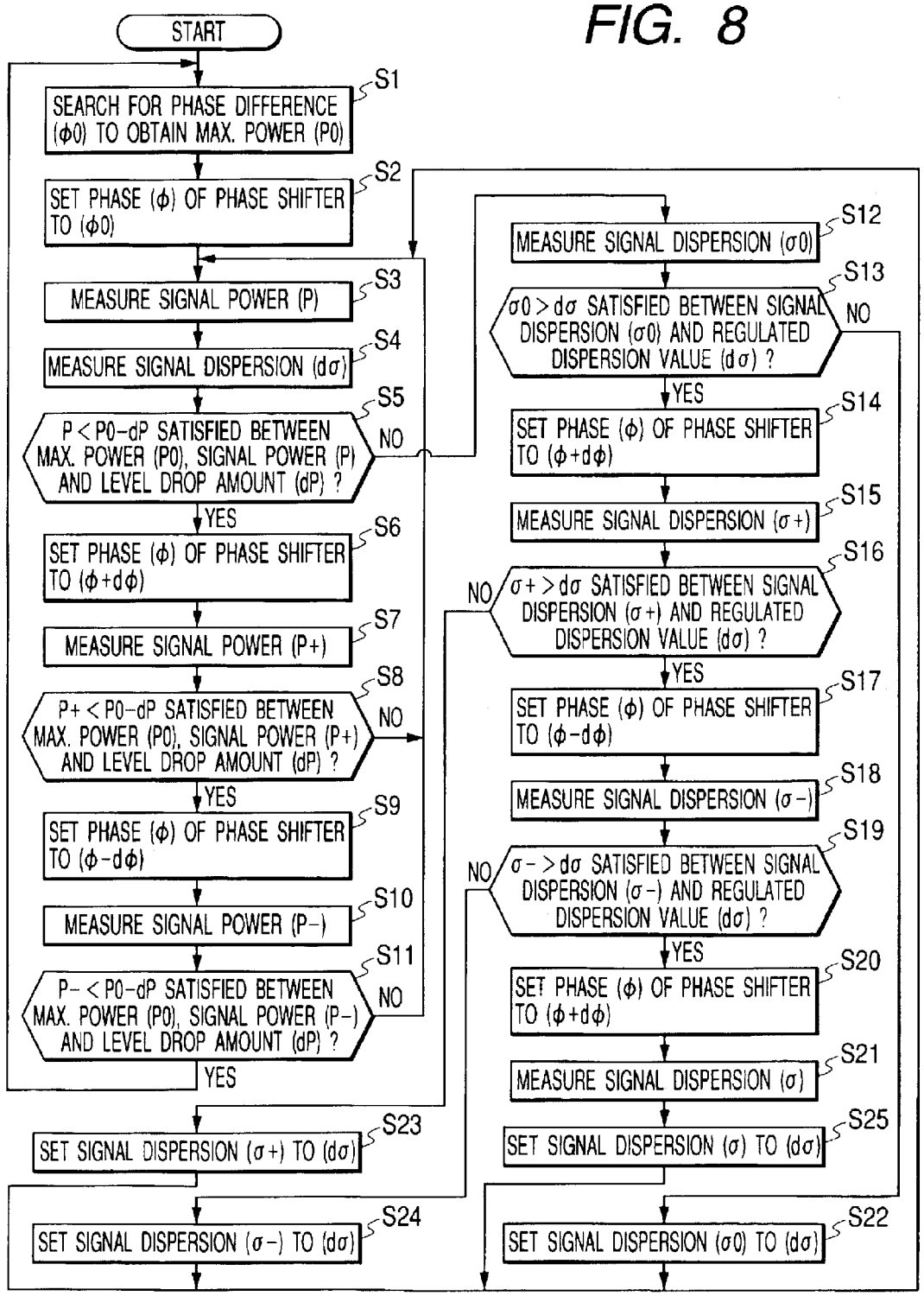
FIG. 8 is a flowchart showing an operation process of phase-shift control of the phase shifter to be executed by phase-amount controller formed by a power detector, a dispersion detector and a phase control section of the OFDM signal receiver shown in FIG. 7.
Figure 11:
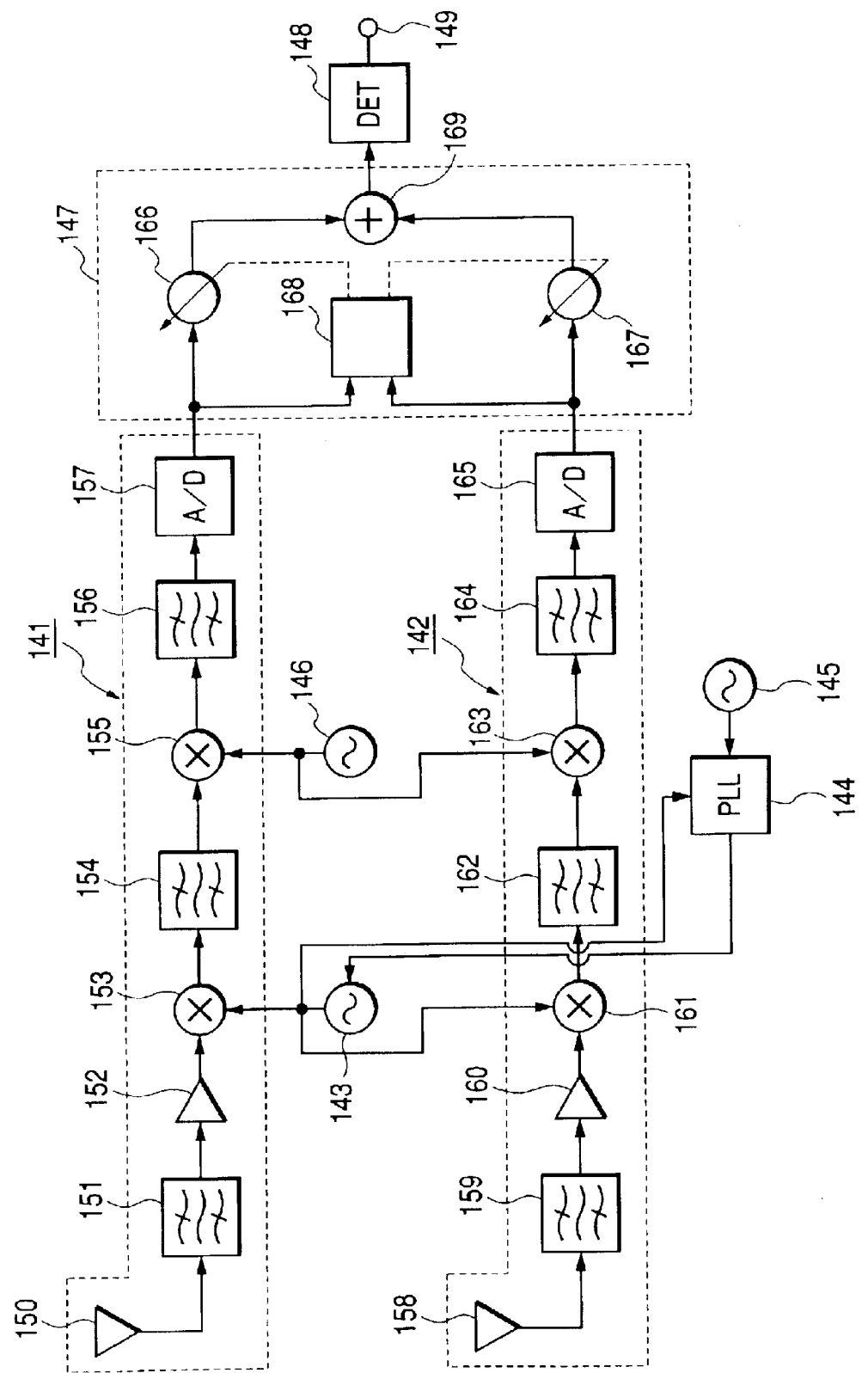
FIG. 11 is a block diagram showing an example of a configuration of a known ODFM signal receiver having a plurality of receiving blocks.
Figure 12:
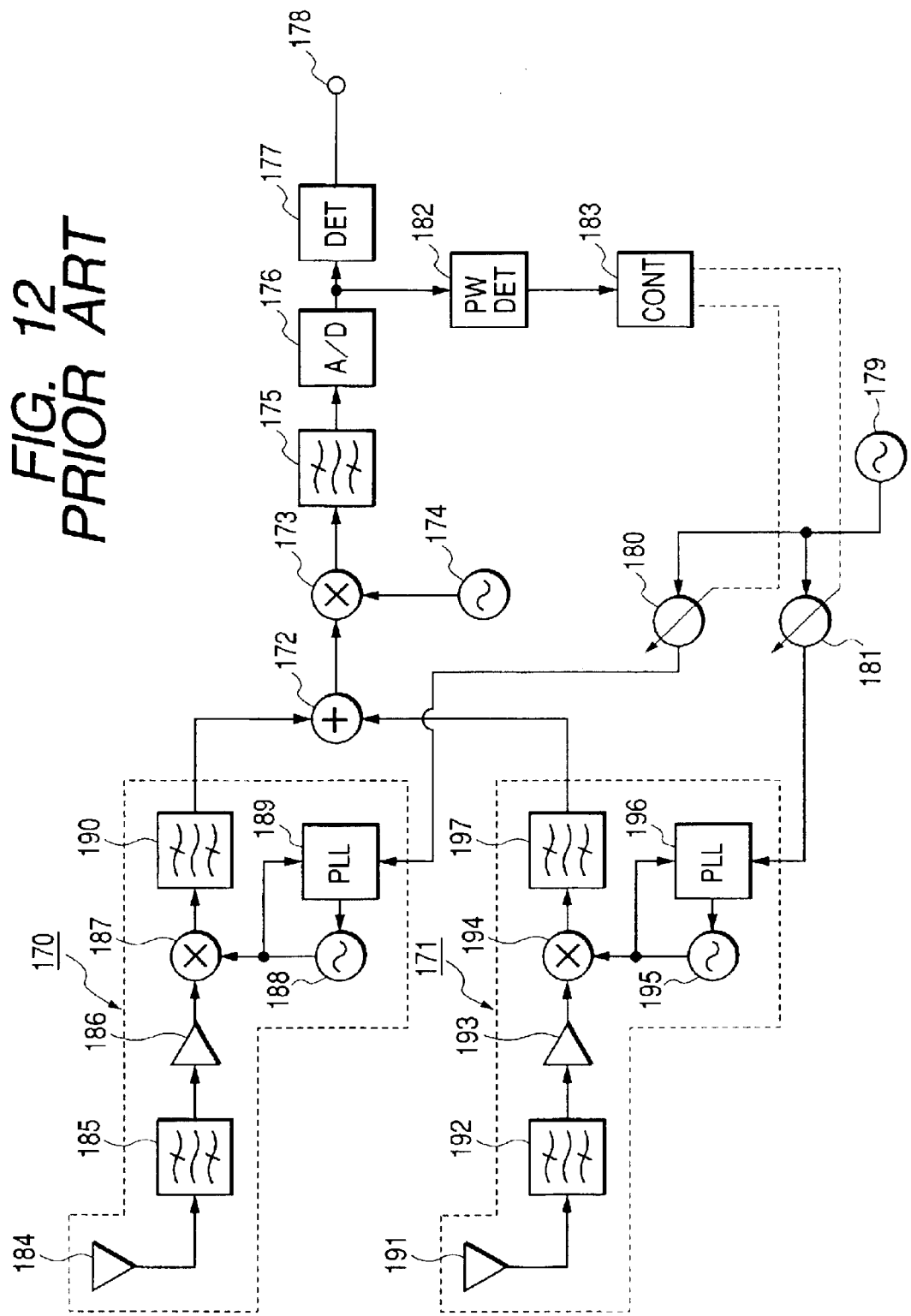
FIG. 12 is a block diagram showing an example of an essential-part configuration of an already proposed OFDM signal receiver.

FIG. 8 is a flowchart showing an operation process, of phase-shift control to the phase shifters 111, 112, to be effected by the phase-amount controller formed by the power detector 113, dispersion detector 114 and phase control section 115 of the OFDM signal receiver shown in FIG. 7.

Meanwhile, FIGS. 9A, 9B and 9C are waveform diagrams showing an example of frequency spectrums of two reception signals that have different amounts of signal dispersion and a frequency spectrum of the transmission signal as an original signal of the reception signals. FIG. 9A is a transmission signal waveform, FIG. 9B is a reception signal waveform having a comparatively large amount of signal dispersion and FIG. 9C is a reception signal waveform having a comparatively small amount of signal dispersion. The horizontal axis represents a frequency while the vertical axis represents signal level.

As shown in FIG. 9A, when a rectangular waveform signal having a constant signal level within a frequency range defined on a transmission signal waveform is transmitted as a radio signal, the reception signal received on the OFDM signal receiver is generally in a rectangular waveform having a varying signal level within the defined frequency range as shown in FIG. 9B or 9C due to occurrence of fading over the transmission path. In this case, the signal waveform shown in FIG. 9B has a signal level variation within the defined frequency range that is comparatively large relative to the mean signal level, i.e. has a large amount of signal dispersion. FIG. 9C illustrates a signal level variation within the defined frequency range that is comparatively small relative to the mean signal level, i.e. a small amount of signal dispersion.

For the OFDM signal receiver of this embodiment, we are thus interested not only with the reception-signal power but with the amount of signal dispersion. As described later, the phase-amount controller is set such that the power of the demodulated signal is equal to or greater than a predetermined value and the signal dispersion amount of the demodulated signal is minimized. The flowchart shown in FIG. 8, explains the operation process of phase-shift control to be executed by the phase-amount controller of the OFDM signal receiver shown in FIG. 7.

First, in step S1, the phase-amount controller searches for the phase difference ($\phi 0$) between the two reference signals outputted from the phase shifters 111, 112 such that the power of the demodulated signal is at a maximum power (P0) depending on a detection result by the power detector 113.

Next, in step S2, the phase-amount controller adjusts/sets the respective phase-shift amounts of the phase shifters 111, 112 such that the phase difference between the two reference signals outputted from the phase shifters 111, 112 becomes ($\phi 0$).

Next, in step S3, the phase-amount controller measures, at the power detector 113, a signal power (P) of the demodulated signal.

Next, in step S4, the phase-amount controller measures, at the dispersion detector 114, a signal dispersion (dσ) of the demodulated signal.

Next, in step S5, the phase-amount controller determines whether the signal power (P), at between the maximum power (P0) and the signal power (P), is smaller than a signal power level drop (dP) from the maximum power (P0) preset in the phase control section 115 (whether or not the condition P<P0−dP is satisfied). If the condition P<P0−dP is satisfied, the process moves to the next step S6. On the other hand, if the condition P<P0−dP is not satisfied, the process moves to the other step S12.

Next, in step S6, the phase-amount controller adjusts/sets the phase amounts respectively of the phase shifters 111, 112 using the phase control section 115 such that the phase difference (φ0) between the reference signals outputted from the phase shifters 111, 112 is increased by a preset amount (dφ). Thus, the phase difference (φ0) increases from the current-set phase difference (φ) to the phase difference (φ+dφ). Next, in step S7, the phase-amount controller measures, at the power detector 113, the signal power (P+) of the demodulated signal at the phase difference (φ+dφ) set in the step S6.

In the subsequent step S8, the phase-amount controller, at the phase control section 115, uses the preset signal power level drop (dP) from the preset maximum power (P0), to determine whether or not the signal power (P+), at between the maximum power (P0) and the signal power (P+) measured in the step S7, is smaller than the maximum power (P0) less the signal power level drop (dP) (whether the condition P+<P0−dP is satisfied or not) When the condition P+<P0−dP is satisfied, the process moves to step S9. On the other hand, when the condition P+<P0−dP is not satisfied, the process returns to the former step S3 to again repeat the operation of step S3 and the subsequent steps.

Subsequently, in step S9, the phase-amount controller adjusts/sets the phase amounts respectively of the phase shifters 111, 112 by the phase control section 115 such that the phase difference (φ0) between the reference signals outputted from the phase shifters 111, 112 decreases by twice the preset amount (2dφ) in the step S6. Thus, the phase difference becomes (φ−dφ).

In the subsequent step S10, the phase-amount controller measures, at the power detector 113, the signal power (P−) of the demodulated signal at the phase difference (φ−dφ) set in the step S9.

Next, in step S11, the phase-amount controller, at the phase control section 115, determines whether or not the signal power (P−), at between the maximum power (P0) and the signal power (P−) measured in the step S10, is smaller the maximum power (P0) less the signal power level drop (dP) (whether the condition P−<P0−dP is satisfied or not). When the condition P−<P0−dP is satisfied, the process returns to the first step S1 to again repeat the operation of step S1 and the subsequent steps. On the other hand, when the condition P−<P0−dP is not satisfied, the process returns to the former step S3 to again repeat the operation of step S3 and the subsequent steps.

Also, in step S12, the phase-amount controller measures, at the dispersion detecting section 114, the signal dispersion value (σ0) of the demodulated signal.

Next, in step S13, the phase-amount controller determines, at the phase control section 115, whether the signal dispersion value (σ0) is greater than a defined signal dispersion value (dσ) at between the signal dispersion value (σ0) measured in the step S12 and the preset defined signal dispersion value (dσ) (whether the condition σ0>dσ is satisfied or not). When the condition σ0>dσ is satisfied, the process moves to the next step S14. On the other hand, when de the condition σ0 >dσ is not satisfied, the process moves to the other step S22.

In the subsequent step S14, the phase-amount controller adjusts/sets the phase amounts respectively of the phase shifters 111, 112 by the phase control section 115 such that the phase difference (σ0) between the reference signals outputted from the phase shifters 111, 112 is increased to larger than the current-set phase difference (φ) by the preset amount (dφ) and becomes (φ+dφ).

Subsequently, in the step S15, the phase-amount controller measures, at the dispersion detector 114, the signal dispersion amount (σ+) of the demodulated signal at the phase difference (φ+dφ) set in the step S14.

Next, in step S16, the phase-amount controller determines, in the phase control section 115, whether or not the signal dispersion value (σ+), at between the signal dispersion value (σ+) measured in the step S15 and the preset defined signal dispersion value (dσ), is greater than the preset defined signal dispersion value (dσ) (whether or not the condition σ+>dσ is satisfied). When the condition σ+>dσ is satisfied, the process moves to the next step S17. On the other hand, when the condition σ+>dσ is not satisfied, the process moves to step S23.

Next, in step S17, the phase-amount controller adjusts/sets, the phase amounts respectively of the phase shifters 111, 112 using the phase control section 115 such that the phase difference (φ0) between the reference signals outputted from the phase shifters 111, 112 is set to a phase difference (φ−dφ), that is the phase difference (φ+dφ) set in the step S14 is decreased by (2dφ).

In the subsequent step S18, the phase-amount controller measures, at the dispersion detector 114, a signal dispersion amount (σ−) of the demodulated signal at the phase difference (φ−dφ) set in the step S17.

Subsequently, in step S19, the phase-amount controller determines, at the phase control section 115, whether or not the signal dispersion value (σ−), at between the signal dispersion value (σ−) measured in the step S18 and the preset defined signal dispersion value (dσ), is greater than the preset defined signal dispersion value (dσ) (whether or not the condition σ−>dσ is satisfied). When the condition σ−>dσ is satisfied, the process moves to the next step S20. On the other hand, when the condition σ−>dσ is not satisfied, the process moves to step S24.

Next, in step S20, the phase-amount controller adjusts/sets the phase amounts respectively of the phase shifters 111, 112 by the phase control section 115 such that the phase difference (φ0) between the reference signals outputted from the phase shifters 111, 112 is increased by twice the preset amount (2dφ) from (φ−dφ) set in the step s17 to (φ+dφ).

Next, in step S21, the phase-amount controller measures, at the power dispersion 114, the signal dispersion value (σ) of the demodulated signal at the phase difference (φ+dφ) set in the step S20.

In the subsequent step S21, the phase-amount controller sets the signal dispersion value (σ) measured by the dispersion detector 114 to the defined signal dispersion value (dσ). After the setting, the process returns to step S3, to again repeat the operation of step S3 and the subsequent steps.

Meanwhile, in step S22, the phase-amount controller sets the signal dispersion value (σ0) measured by the dispersion detector 114 to the defined signal dispersion value (dσ). After the setting, the process returns to step S3, to again repeat the operation of step S3 and the subsequent steps.

Furthermore, in step S23, the phase-amount controller sets the signal dispersion value (σ+) measured by the dispersion detector 114 to the defined signal dispersion value (dσ). After the setting, the process returns to step S3, to again repeat the operation of step S3 and the subsequent steps.

Also, in step S24, the phase-amount controller sets the signal dispersion value (σ−) measured by the dispersion detector 114 to the defined signal dispersion value (dσ). After the setting, the process returns to step S3, to again repeat the operation of step S3 and the subsequent steps.

In this manner, according to the OFDM signal receiver of this embodiment, the phase-amount controller controls the phase-shift amounts with respect to the reference signals of the phase shifters 111, 112. Thus, when the signal power of a demodulated signal of the OFDM demodulator 108 is made equal to or greater than the predetermined value, the signal dispersion in the demodulated signal can be minimized. Accordingly, it is possible not only to carry out preferred signal reception similarly to that of the conventional OFDM receiver of this kind but also to receive signals with minimized bit error rate (BER).

as Although the adjustable reference-signal generator has been shown as being formed by the reference-signal generator 110 and the two phase shifters 111, 112, the adjustable reference-signal generator may comprise another configuration, e.g. a digital-synthesizer configuration. FIG. 10 is a block diagram showing an example of adjustable reference-signal generator of a digital-synthesizer configuration.

As shown in FIG. 10, the adjustable reference-signal generator is configured with digital synthesizers 130, 131 respectively incorporating ROMs 130R, 131R, digital-analog converters (D/A) 132, 133, and band-pass filters 134, 135.

The digital synthesizer 130 has an output end connected to an input end of the digital-analog converter 132, to be supplied with a clock signal, frequency data and phase data. The digital synthesizer 131 has an output end connected to an input end of the digital-analog converter 133, to be supplied with a clock signal, frequency data and phase data. The digital-analog converter 132 has an output end connected to an input end of the band-pass filter 134 while the digital-analog converter 133 has an output end connected to an input end of the band-pass filter 135. The band-pass filter 134 has an output end connected to a control input end (reference-signal input end) of the PLL circuit 121 (see FIG. 1) while the band-pass filter 135 has an output end connected to a control input end (reference-signal input end) of the PLL circuit 128 (see FIG. 1). In this case, both the digitized amplitude and phase of a period of sinusoidal wave data are stored in the ROMs 130R, 131R respectively incorporated in the digital synthesizers 130, 131.

The adjustable reference-signal generator of the digital synthesizer configuration operates as follows.

When the same clock signal and frequency data is supplied to the digital synthesizers 130, 131, the incorporated ROMs 130R, 131R generate a sinusoidal wave data of the same frequency in synchronism with the clock signal. Digital phase data supplied from the phase-amount controller to the digital synthesizers 130, 131 is used to set the phase of the sinusoidal wave data to be generated by the ROM 130R, 131R. The sinusoidal wave data outputted from the digital synthesizer 130, 131 is digital-analog-converted by the analog-digital converter 132, 133, thus converted into an analog sinusoidal wave signal. The analog sinusoidal wave signals are removed of unwanted frequency components by the band-pass filters 134, 135, and respectively supplied as reference signals to the PLL circuits 121, 128 shown in FIG. 7.

The phase and frequency of the reference signal can be digitally control-processed by using the adjustable reference-signal generator in the digital synthesizer configuration described above. Accordingly, both the configuration of the adjustable reference-signal generator and the control process can be simplified.

In addition, the OFDM signal receiver described in the embodiment above is a double super heterodyne structure having the second frequency mixer 104, second local oscillator 105 and second intermediate-frequency filter 106 between the adder 103 and the analog-digital converter 107. However, the OFDM signal receiver of the invention is not limited to the double super heterodyne scheme. Depending upon the frequency of the reception signal or first intermediate-frequency signal to be used, it is possible to omit the second frequency mixer 104, second local oscillator 105 and second intermediate-frequency filter 106 and use a single super heterodyne scheme instead.

Furthermore, although the OFDM signal receiver in the foregoing embodiment is suited for the vehicular application, such as on an automobile, the OFDM signal receiver of the invention is not limited to such an application but can be used in other applications.

As described above, the present invention provides the following benefits. A phase-shift adjusted state of the adjustable reference-signal generator is stored immediately before turning off the power and remains stored so long as power is not supplied to the receiver. When the power is supplied to the receiver, the switch-on time in the plurality of switches is controlled and set such that the reference signals frequency-divided in the PLL circuits have the same phase while the adjustable reference-signal generator is set in the phase-shift adjusted state stored immediately before turning off the power previously. Because the signal power of the added intermediate-frequency signal is maximized, there is no need to optimally adjust a phase-shift amount of the reference signal for each of the plurality of receiving blocks. Thus, normal signal reception is possible in the receiver immediately after turning on the power.

An additional benefit of the embodiment is that the configuration of the adjustable reference-signal generator can be simplified to reduce the signal loss caused by the plurality of phase shifters. Another benefit of the embodiment in addition to simplification of the adjustable reference-signal generator configuration is that, because the phase and frequency of the reference signal can be digitally control-processed, the control process can be simplified.

In addition, the demodulator supplies phase comparison signals obtained by the PLL circuit. By comparing between phase states of supplied phase comparison signals, switch-on time is determined for the plurality of switches. Accordingly, required switch-on time can be controlled without complicating the configuration of the control system.

Furthermore, the demodulator stores to the memory a phase-shift adjusted state of the adjustable reference signal generator of immediately before turning off the power to the receiver. When the power is turned on, the phase-shift adjusted state of the adjustable reference signal generator stored in the memory is used. This facilitates setting of the adjustable reference-signal generator to the phase-shift state and correct reproduction of the phase-shift adjusted state of the adjustable reference-signal generator immediately before the power was turned off. Thus, because the storage content of the memory is updated at constant time intervals, it is possible to use a small storage capacity for the memory.

In order to supply phase-shifted reference signals respectively to the PLL circuits of the plurality of receiving blocks, the phase-shift amount controller connected to the OFDM demodulator is used to adjust the phase-shift amount of the adjustable reference-signal generator. By carrying out the adjustment, the demodulated signal of the OFDM demodulator is increased in power to a predetermined value or higher and the signal dispersion of the demodulated signal is minimized. Accordingly, preferred signal reception is possible in addition to having a minimal bit error rate.

Also, the adjustable reference-signal generator can be simplified in configuration and the signal loss due to the provision of a plurality of phase shifters can be reduced. In addition to simplification of the configuration, the control process can be simplified because the phase and frequency of the reference signal can be digitally control-processed.

Power detection and dispersion detection of the demodulated signal can be individually performed without interference between the detections.

Finally, because the receiver is configured in a double super heterodyne scheme, the first and second local oscillation signals can be selected with respective frequency bands comparatively freely.

What is claimed is:

1. A receiver comprising:
    a plurality of receiving blocks, each receiving block having an antenna, a frequency mixer that frequency-converts a reception signal received at the antenna, a local oscillator that supplies a local oscillation signal to the frequency mixer, a PLL circuit that sets an oscillation frequency of the local oscillator, and an intermediate-frequency circuit that selects an intermediate-frequency signal out of an output frequency-mixed signal of the frequency mixer;
    an adder that adds together output signals of the plurality of receiving blocks;
    a reproduction processor that reproduces an output added signal of the adder;
    an adjustable reference-signal generator that:
        supplies phase-shifted reference signals respectively to the PLL circuits of the plurality of receiving blocks, and
        adjusts a phase shift of the reference signals such that, upon power being first supplied to the receiver, the reference signals are set to an initial phase-shift adjusted state that was stored immediately before turning off power to the receiver previously and, during steady state operation, output signals of the plurality of receiving blocks have the same phase; and
    a plurality of switches connected between the respective PLL circuits and the adjustable reference-signal generator, switch-on times of the switches controllable such that the reference signals frequency-divided by the respective PLL circuits have the same phase upon power being first supplied to the receiver.

2. A receiver according to claim 1, wherein the adjustable reference-signal generator comprises a reference-signal oscillator common between the plurality of receiving blocks to generate reference signals and a plurality of phase shifters to individually phase-shift the reference signals.

3. A receiver according to claim 1, wherein the adjustable reference-signal generator comprises a plurality of digital synthesizers supplied with phase data to generate individually phase-shifted reference signals.

4. A receiver according to claim 1, wherein the reproduction processor, upon power being first supplied to the receiver, controls the switch-on time of the plurality of switches depending on phase comparison signals supplied from the PLL circuits.

5. A receiver according to claim 1, wherein the reproduction processor is connected with a memory that stores the initial phase-shift adjusted state, the phase-shift adjusted state of the adjustable reference-signal generator stored in the memory being read out when power is supplied to the receiver thereby setting the adjustable reference-signal generator to a read-out phase-shift adjusted state.

6. A receiver according to claim 5, wherein the reproduction processor, during steady operation, updates and stores a new phase-shift adjusted state of the adjustable reference-signal generator to the memory each time a constant time elapses.

7. An OFDM signal receiver comprising:
    a plurality of receiving blocks, each receiving block having an antenna, a frequency mixer that frequency-converts an OFDM signal received at the antenna, a local oscillator that supplies a local oscillation signal to the frequency mixer, a PLL circuit that sets an oscillation frequency of the local oscillator, and an intermediate-frequency circuit that selects an intermediate-frequency signal out of an output frequency-mixed signal of the frequency mixer;
    an adder that adds together an intermediate frequency signal outputted from the plurality of receiving blocks;
    an analog-digital converter that converts an added intermediate-frequency signal outputted from the adder into a digital signal;
    an OFDM demodulator that OFDM-demodulates the digital signal;
    a phase-shift amount controller connected to the OFDM demodulator to set an amount of phase-shift of the adjustable reference-signal generator such that a demodulated signal of the OFDM demodulator has a power of at least a predetermined value and power dispersion of the demodulated signal is minimized, wherein the phase-shift amount controller includes a power detector that detects the power of the demodulated signal of the OFDM demodulator and a power dispersion detector that detects the dispersion of the demodulated signal of the OFDM demodulator.

8. An OFDM signal receiver according to claim 7, wherein the adjustable reference-signal generator comprises a reference-signal oscillator common between the plurality of receiving blocks to generate reference signals and a plurality of phase shifters to individually phase-shift the reference signals.

9. An OFDM signal receiver according to claim 7, wherein the adjustable reference-signal generator comprises a plurality of digital synthesizers supplied with phase data to generate individually phase-shifted reference signals.

10. An ODFM signal receiver according to claim 7, further comprising, between the adder and the analog-digital converter, a second frequency mixer that frequency-converts the added intermediate-frequency signal into a second intermediate-frequency signal, a second local oscillator that supplies a second local oscillation signal to the second frequency mixer, and a second intermediate-frequency circuit that selects a second intermediate-frequency signal out of an output frequency-mixed signal of the second frequency mixer.

11. A method of maximizing output signal power while minimizing signal dispersion of a receiver when power is first supplied to the receiver after power to the receiver has been terminated, the method comprising:

storing an initial phase-shift adjusted state of an adjustable reference-signal generator immediately before power to the receiver has been terminated;

supplying phase-shifted reference signals to PLL circuits of a plurality of receiving blocks of the receiver via the adjustable reference-signal generator when power is supplied to the receiver;

adjusting a phase shift of the reference signals such that when power is first supplied to the receiver after power to the receiver has been terminated the reference signals are set to the initial phase-shift adjusted state;

controlling reference signals frequency-divided by the PLL circuits to have the same phase upon first supplying power to the receiver; and adjusting a phase shift of the reference signals such that output signals of the receiving blocks have the same phase during steady state operation.

12. The method of claim 11, further comprising controlling switch-on times of switches connected between the PLL circuits and the adjustable reference-signal generator such that the reference signals frequency-divided by the PLL circuits have the same phase upon power being first supplied to the receiver.

13. The method of claim 12, further comprising controlling the switches by generating and comparing phase comparison signals from the PLL circuits, determining phases of the phase comparison signals, taking the phase comparison signal delayed greatest in phase as a reference phase comparison signal, determining a phase difference between the phase comparison signals and the reference phase comparison signal, and grounding each switch for a time that corresponds to the particular phase difference associated with that switch.

14. The method of claim 11, further comprising:

detecting power of a demodulated signal from the receiver;

determining a phase difference between reference signals outputted from phase shifters, searching for a first phase difference at which maximum power of the demodulated signal is obtained, and adjusting an amount of phase-shift of the phase shifters such that the phase difference is set to the first phase difference;

after the amount of phase-shift has been adjusted, measuring power and signal dispersion of the demodulated signal at the first phase difference, changing the phase difference between the reference signals by a preset amount to one of an increased phase difference and a decreased phase difference and measuring power of the demodulated signal at each of the increased and decreased phase differences, and determining whether the power measured at each of the first, increased, and decreased phase difference is smaller than a power difference of the maximum power less a predetermined amount;

when the power measured at the first phase difference is not smaller than the power difference, detecting a signal dispersion value of the demodulated signal at the first phase difference and each of the increased and decreased phase difference, if any of the detected signal dispersion values are less than a preset signal dispersion value setting the preset signal dispersion value to the smaller signal dispersion value; and repeating measurements of the power and signal dispersion value at various phase differences until power is no longer supplied to the receiver.

15. The method of claim 14, further comprising updating and storing the phase-shift adjusted state of the adjustable reference-signal generator when the receiver reaches steady state operation.

* * * * *